United States Patent
Yamashita et al.

(10) Patent No.: US 11,247,619 B2
(45) Date of Patent: Feb. 15, 2022

(54) SLIDE DOOR HARNESS

(71) Applicant: Yazaki Corporation, Tokyo (JP)

(72) Inventors: Hiroshi Yamashita, Shizuoka (JP); Shinji Kato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/930,262

(22) Filed: Jul. 15, 2020

(65) Prior Publication Data
US 2021/0016725 A1 Jan. 21, 2021

(30) Foreign Application Priority Data

Jul. 18, 2019 (JP) .............................. JP2019-132442

(51) Int. Cl.
*B60R 16/02* (2006.01)
*H01B 7/00* (2006.01)
*B60R 16/027* (2006.01)

(52) U.S. Cl.
CPC ....... *B60R 16/0207* (2013.01); *H01B 7/0045* (2013.01); *B60R 16/027* (2013.01); *B60R 16/0215* (2013.01)

(58) Field of Classification Search
CPC . B60R 16/0207; B60R 16/0215; B60R 16/02; B60R 16/027
See application file for complete search history.

(56) References Cited

U.S. PATENT DOCUMENTS

| | | | | |
|---|---|---|---|---|
| 7,381,897 B2* | 6/2008 | Nishijima | ............ | H02G 11/006 174/135 |
| 2002/0014348 A1* | 2/2002 | Aoki | ............. | H02G 11/006 174/72 A |
| 2002/0129962 A1* | 9/2002 | Doshita | ............. | B60R 16/0215 174/72 A |
| 2004/0108127 A1* | 6/2004 | Aoki | ............. | B60R 16/0215 174/72 A |
| 2006/0021781 A1* | 2/2006 | Tsubaki | ............. | H02G 11/00 174/72 A |
| 2006/0027391 A1* | 2/2006 | Tsubaki | ............. | H02G 11/006 174/72 A |
| 2007/0025061 A1* | 2/2007 | Kogure | ............. | H02G 3/0468 361/437 |

(Continued)

FOREIGN PATENT DOCUMENTS

JP 2010-184593 A 8/2010

*Primary Examiner* — Paresh H Paghadal
(74) *Attorney, Agent, or Firm* — Kenealy Vaidya LLP

(57) ABSTRACT

A slide door harness includes a wiring material, a vehicle body-side fixing portion provided in a vehicle body to rotatably hold an end of the wiring material below a lower end of an inner surface member of a slide door, and a door-side fixing portion provided on the slide door to rotatably hold another end of the wiring material, and the door-side fixing portion includes a holding portion configured to hold the another end of the wiring material toward the lower end side of the inner surface member, a first rotating shaft configured to allow the holding portion to rotate around a first rotation axis, and a second rotating shaft configured to allow the holding portion and the first rotating shaft to integrally rotate around a second rotation axis intersecting the first rotation axis.

2 Claims, 24 Drawing Sheets

(56) References Cited

U.S. PATENT DOCUMENTS

| | | | |
|---|---|---|---|
| 2007/0107926 A1* | 5/2007 | Nishijima | H02G 11/006 174/72 A |
| 2007/0119610 A1* | 5/2007 | Kisu | H02G 11/006 174/72 A |
| 2009/0223132 A1* | 9/2009 | Aoki | B60R 16/0215 49/360 |
| 2016/0236630 A1* | 8/2016 | Ogawa | B60R 16/02 |

* cited by examiner

SLIDE DOOR HARNESS

CROSS-REFERENCE TO RELATED APPLICATION(S)

The present application claims priority to and incorporates by reference the entire contents of Japanese Patent Application No. 2019-132442 filed in Japan on Jul. 18, 2019.

BACKGROUND OF THE INVENTION

1. Field of the Invention

The present invention relates to a slide door harness.

2. Description of the Related Art

As a technology related to a conventional slide door harness, for example, Japanese Patent Application Laid-open No. 2010-184593 discloses a wiring structure for a slide door harness that includes a harness and a holder. The harness is bridged between a vehicle body and a slide door. The holder is located below a step member provided for a door opening and moves integrally with the slide door.

Incidentally, the wiring structure for the slide door harness described in Japanese Patent Application Laid-open No. 2010-184593 described above has room for further improvement, for example, in terms of more appropriate wiring.

SUMMARY OF THE INVENTION

The invention has been made in view of the above circumstances, and an object of the invention is to provide a slide door harness capable of properly wiring a wiring material with respect to a slide door.

In order to achieve the above mentioned object, a slide door harness according to one aspect of the present invention includes a wiring material wired across a slide door slidably provided between a fully closed position and a fully open position with respect to a vehicle body and the vehicle body; a vehicle body-side fixing portion provided in the vehicle body to hold one end of the wiring material below a lower end of an inner surface member of the slide door on a side of the vehicle body in a vertical direction such that the end is allowed to rotate with slide movement of the slide door; and a door-side fixing portion provided on the slide door by being positioned on an opposite side from a side of the vehicle body-side fixing portion with the inner surface member interposed therebetween to hold another end of the wiring material such that the another end is allowed to rotate with slide movement of the slide door, wherein the door-side fixing portion includes a holding portion configured to hold the another end of the wiring material toward a side of the lower end of the inner surface member in the vertical direction, a first rotating shaft configured to allow the holding portion to rotate around a first rotation axis, and a second rotating shaft configured to allow the holding portion and the first rotating shaft to integrally rotate around a second rotation axis intersecting the first rotation axis, and rotation around the first rotation axis by the first rotating shaft and rotation around the second rotation axis by the second rotating shaft are combined so that the another end of the wiring material is rotated downward in the vertical direction with slide movement of the slide door from a side of the fully closed position to a side of the fully open position, the wiring material is positioned across the vehicle body-side fixing portion side and the door-side fixing portion side by straddling the lower end of the inner surface member in the vertical direction, the another end of the wiring material is rotated upward in the vertical direction with slide movement of the slide door from the fully open position side to the fully closed position side, the another end of the wiring material is held above the lower end of the inner surface member in the vertical direction at the fully closed position, and the wiring material is positioned on the door-side fixing portion side of the inner surface member.

According to another aspect of the present invention, in the slide door harness, it is possible to configure that the door-side fixing portion includes a rotation restricting portion configured to restrict rotation around the second rotation axis by the second rotating shaft at an intermediate position where the wiring material and the lower end of the inner surface member in the vertical direction do not interfere with each other with slide movement of the slide door from the fully closed position side to the fully open position side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the invention will be described in detail with reference to the drawings. Note that the invention is not limited by this embodiment. In addition, constituent elements in the following embodiment include elements that can be easily replaced by those skilled in the art, or substantially the same elements.

Note that in the following description, of a first direction, a second direction, and a third direction intersecting one another, the first direction is referred to as a "vertical direction X", the second direction is referred to as a "first cross direction Y", and the third direction is referred to as a "second cross direction Z". The vertical direction X, the first cross direction Y, and the second cross direction Z are substantially orthogonal to one another. The first cross direction Y and the second cross direction Z are typically directions along a horizontal direction and correspond to directions along a slide direction of a slide door. The vertical direction X corresponds to, for example, a vehicle height direction of a vehicle in which a slide door harness is mounted. The first cross direction Y corresponds to, for example, a vehicle front-back direction (full length direction) of the vehicle in which the slide door harness is mounted. The second cross direction Z corresponds to, for example, a vehicle width direction (full width direction) of the vehicle in which the slide door harness is mounted. In addition, unless otherwise specified, each direction used in the following description represents a direction in a state in which respective parts are assembled together. In addition, in each drawing, each member is illustrated in a simplified and abbreviated manner as appropriate.

Embodiment

Figure 1:
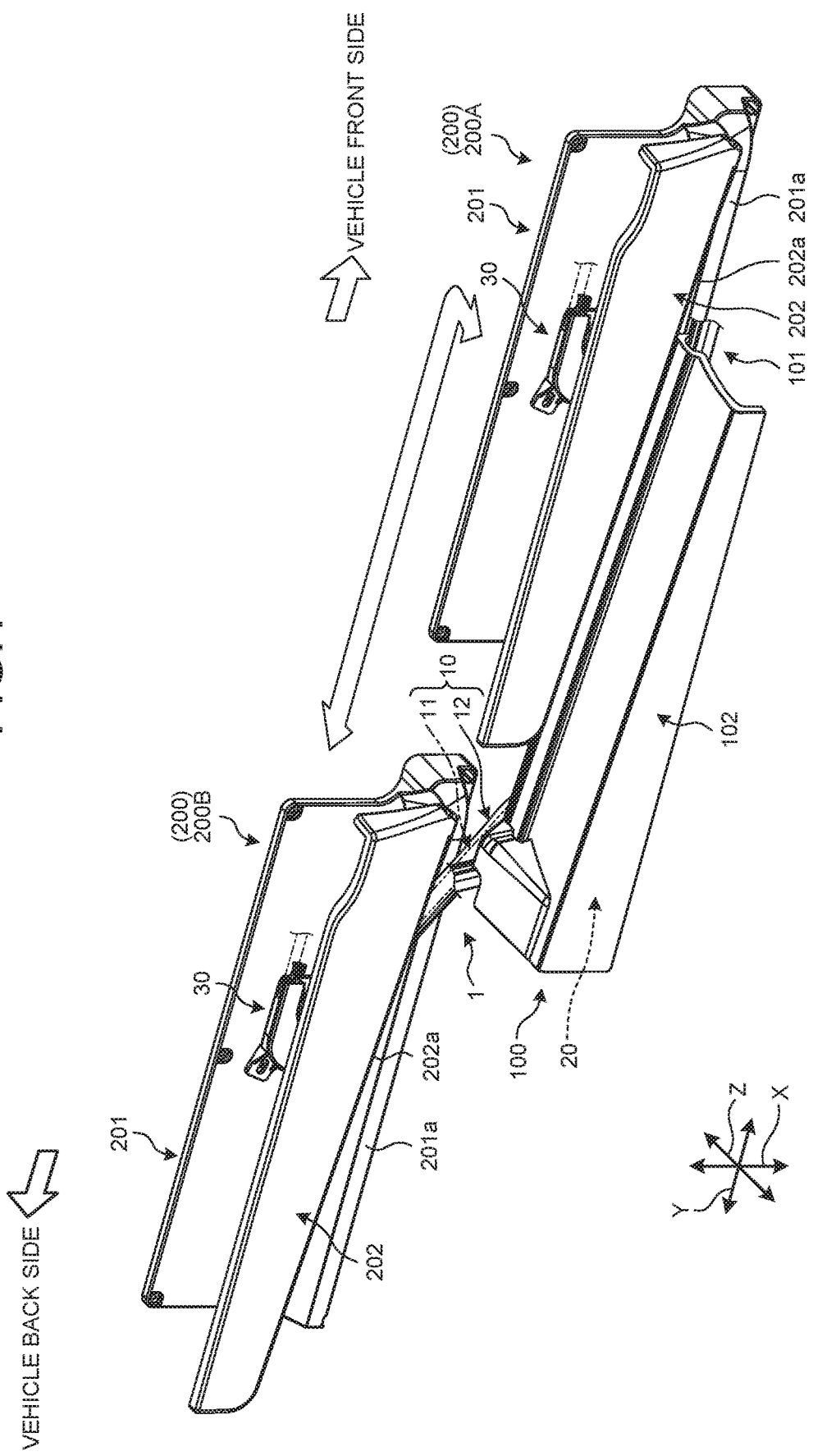
FIG. 1 is a schematic perspective view illustrating a schematic configuration of a slide door harness according to an embodiment and slide movement of a slide door.
Figure 2:
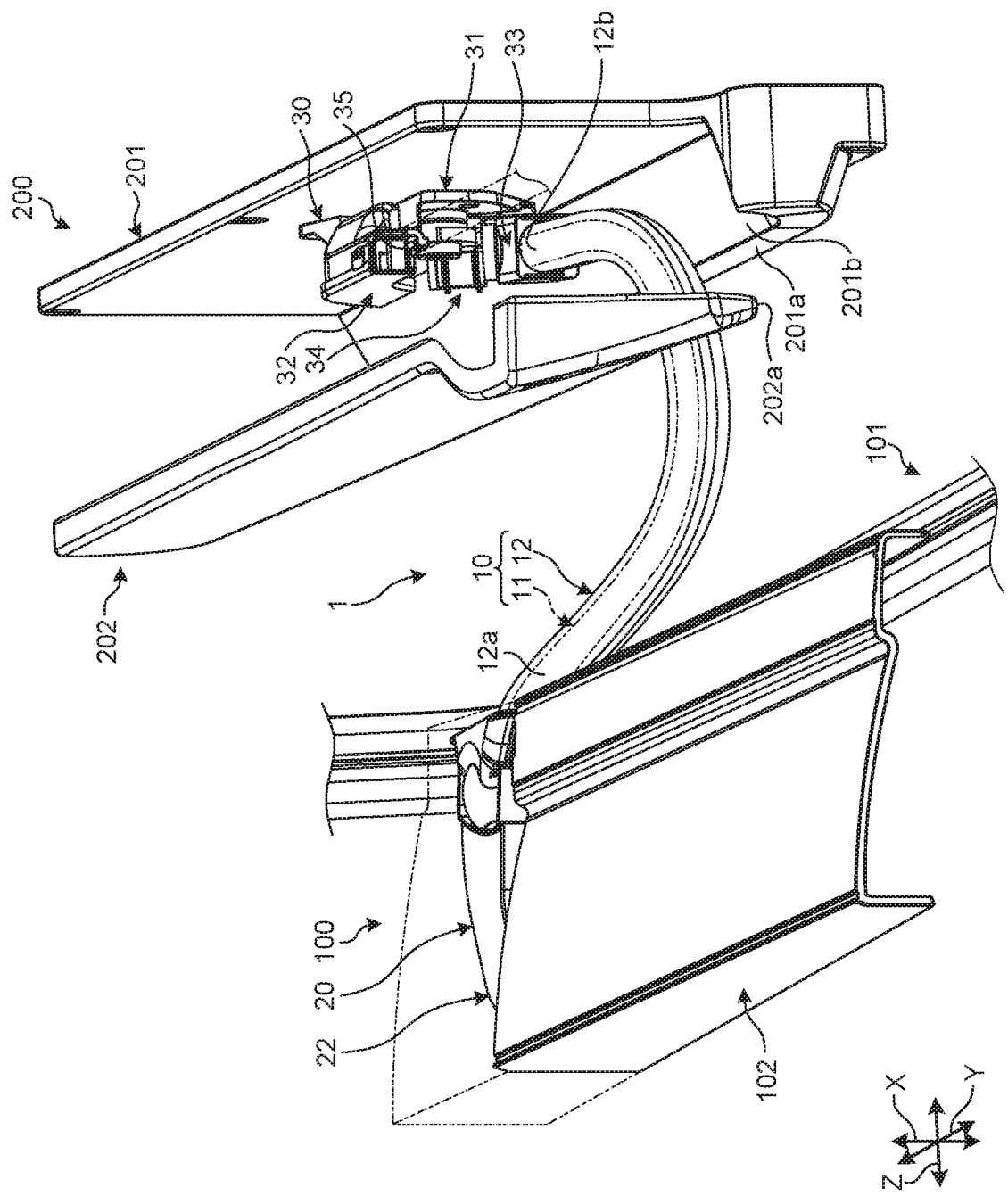
FIG. 2 is a perspective view illustrating a schematic configuration of the slide door harness according to the embodiment.

A slide door harness 1 of the present embodiment illustrated in FIG. 1 and FIG. 2 is applied to a vehicle and is included in a slide door constant power supply harness that supplies power (supply of power) to a slide door 200 supported by a vehicle body 100.

The slide door 200 corresponding to a target of power supply by the slide door harness 1 is located to face the vehicle body 100 in the second cross direction Z, supported through a support mechanism (not illustrated) with respect to the vehicle body 100, and provided to be slidable between a fully closed position and a fully open position. In FIG. 1, the slide door 200 at the fully closed position is illustrated by "slide door 200A", and the slide door 200 at the fully open position is illustrated by "slide door 200B". The slide door 200 is slidable with respect to the vehicle body 100 between the fully closed position and the fully open position along the first cross direction Y and the second cross direction Z. More specifically, the slide door 200 slides along the first cross direction Y between the fully closed position and the fully open position, and slides along the second cross direction Z so as to approach and separate from the vehicle body 100 in the vicinity of the fully closed position. Note that in the following description, in the first cross direction Y, a fully closed position side (slide door 200A side) of the slide door 200 may be referred to as "fully closed position side in the first cross direction Y", and a fully open position side (slide door 200B side) of the slide door 200 may be referred to as "fully open position side in the first cross direction Y" in some cases. Typically, the fully closed position side in the first cross direction Y corresponds to a vehicle front side, and the fully open position side in the first cross direction Y corresponds to a vehicle back side.

FIGS. 1 and 2, etc. illustrate parts of an inner panel 201 and a trim 202 of members included in the slide door 200. The inner panel 201 is a panel-shaped structural member included in the slide door 200. Meanwhile, the trim 202 is a panel-shaped interior member that is located on the vehicle body 100 side of the inner panel 201 with respect to the second cross direction Z and included in an inner surface member of the slide door 200 on the vehicle body 100 side. The inner panel 201 and the trim 202 are formed in a substantially plate shape whose plate thickness direction extends along the second cross direction Z, and extend along the vertical direction X and the first cross direction Y. Here, a lower end 202a of the trim 202 in the vertical direction X is inclined with respect to the horizontal direction so that an end on the fully closed position side in the first cross direction Y is located below an end on the fully open position side in the vertical direction X. In addition, the inner panel 201 has a protrusion 201a at a lower end in the vertical direction X. The protrusion 201a is formed so as to protrude toward the vehicle body 100 side along the second cross direction Z and extend along the first cross direction Y. The protrusion 201a corresponds to an inclined surface 201b whose upper surface in the vertical direction X faces downward in the vertical direction X toward the vehicle body 100 side. The protrusion 201a is a part that comes into contact with a weather strip 101 provided on the vehicle body 100 side when the slide door 200 is at the fully closed position (slide door 200A) and is included in a pressing surface against the weather strip 101. Here, the weather strip 101 is a strip-shaped seal component that prevents rain, dust, and noise from entering the vehicle. The weather strip 101 is provided along a lower edge of a scuff 102 provided on the vehicle body 100 side in the vertical direction X. The scuff 102 is a member provided at a lower end of an opening in the vertical direction X opened and closed by the slide door 200 in the vehicle body 100. In FIG. 2, etc., a part of the scuff 102 is indicated by a two-dot chain line.

In the slide door harness 1 of the present embodiment, a wiring material 10 is wired across the slide door 200 configured as above and the vehicle body 100. The slide door harness 1 performs power supply or signal communication from a power supply or control equipment on the vehicle body 100 side to various load devices (for example, a speaker, an airbag, a power window, a driving device, etc.) on the slide door 200 side via the wiring material 10.

Further, the slide door harness 1 of the present embodiment holds an end of the wiring material 10 by rotating the end around two axes with slide movement of the slide door 200 on the slide door 200 side configured as described above. According to this configuration, the slide door harness 1 implements a configuration having an excellent appearance by the wiring material 10, etc. housed on the inner panel 201 side of the trim 202 when fully closed while avoiding interference between the wiring material 10 and the trim 202, etc. with slide movement of the slide door 200. Hereinafter, a configuration of the slide door harness 1 will be described in detail with reference to the drawings.

Specifically, as illustrated in FIGS. 1 and 2, the slide door harness 1 includes the wiring material 10, a vehicle body-side fixing portion 20, and a door-side fixing portion 30. The vehicle body-side fixing portion 20 is provided on the vehicle body 100 side. The door-side fixing portion 30 is provided on the slide door 200 side. The wiring material 10 is provided to be bridged across the vehicle body-side fixing portion 20 and the door-side fixing portion 30.

As described above, the wiring material 10 is a member wired across the slide door 200 and the vehicle body 100. For example, at the fully open position (slide door 200B), etc. of the slide door 200, the wiring material 10 is wired across the vehicle body-side fixing portion 20 side and the door-side fixing portion 30 side by straddling the lower end 202a of the trim 202 in the vertical direction X. The wiring material 10 of the present embodiment includes an electric wire 11 and an exterior material 12. In the present embodiment, the wiring material 10 whose both ends are held by the vehicle body-side fixing portion 20 and the door-side fixing portion 30 corresponds to the exterior material 12.

The electric wire 11 is a member that electrically connects a device on the vehicle body 100 side and a device on the slide door 200 side. In FIGS. 1 and 2, etc., a part of the electric wire 11 is indicated by a two-dot chain line. The electric wire 11 is obtained by covering an outside of a conductor portion (core wire) made of a plurality of metal wires having conductivity with a covering portion having an insulating property. The electric wire 11 may be configured by bundling a plurality of electric wires. For example, the electric wire 11 includes a power supply line for supplying power and a signal line for signal communication.

The exterior material 12 is a member that is exteriorly mounted on the electric wire 11. For example, the exterior material 12 includes a corrugated tube, etc. formed in a tubular shape using a resin material having an insulating property. The electric wire 11 is inserted into the exterior material 12 to protect the electric wire 11. The exterior material 12 of the present embodiment is exteriorly mounted on a portion of the electric wire 11 bridged across the slide door 200 and the vehicle body 100. Moreover, an outer peripheral surface of the exterior material 12 may be formed in a bellows shape (uneven shape). For example, the exterior material 12 may be formed to have relatively high flexibility in the first cross direction Y and the second cross direction Z so as to easily bend, and have relatively high rigidity in the vertical direction X so as to rarely bend and sag by adjusting the bellows shape. In the slide door harness 1 of the present embodiment, ends of the exterior material 12 included in the wiring material 10 are held by the vehicle body-side fixing portion 20 and the door-side fixing portion 30, respectively. The electric wire 11 inserted into the exterior material 12 extends between the vehicle body-side fixing portion 20 and the door-side fixing portion 30, and passes through the vehicle body-side fixing portion 20 and the door-side fixing portion 30 to further extend to a connection target. Note that the exterior material 12 may include a so-called cable bear (registered trademark), etc. that protects and guides the electric wire 11, etc. provided in a movable portion.

The vehicle body-side fixing portion 20 is a portion provided in the vehicle body 100 to hold one end 12a of the exterior material 12 included in the wiring material 10 so that the end 12a can rotate with slide movement of the slide door 200. The vehicle body-side fixing portion 20 is built in the vehicle body 100 below the scuff 102 in the vertical direction X and is fixed to a structural member of the vehicle body 100. In this way, the vehicle body-side fixing portion 20 is disposed at a position at which the vehicle body-side fixing portion 20 cannot be seen from the interior of the vehicle. The vehicle body-side fixing portion 20 rotatably holds the end 12a of the exterior material 12 around at least a rotation axis along the vertical direction X. In this way, the vehicle body-side fixing portion 20 can rotate the end 12a of the exterior material 12 so that the end 12a swings along the horizontal direction intersecting the vertical direction X with slide movement of the slide door 200.

Figure 3:
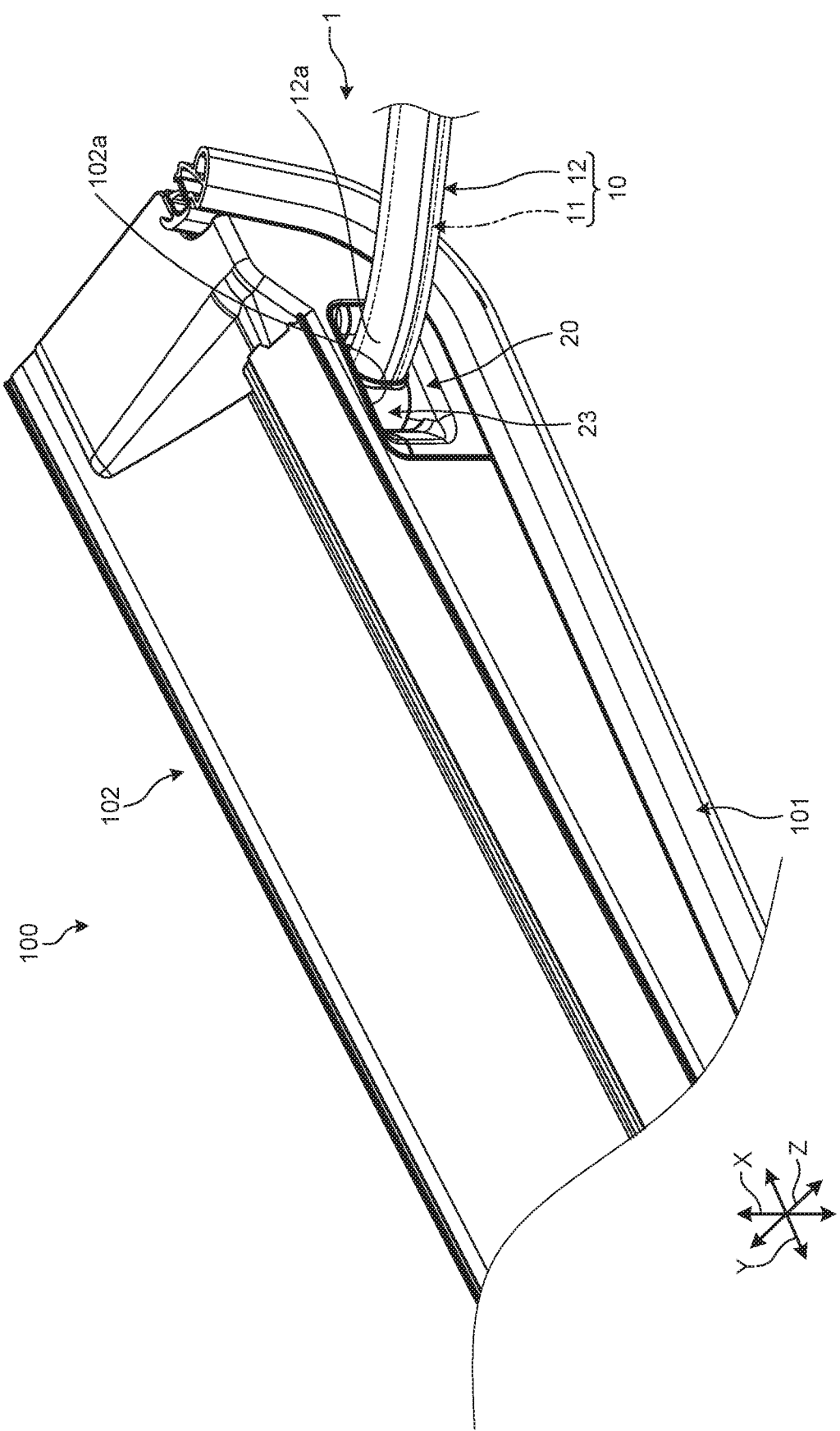
FIG. 3 is a perspective view illustrating a schematic configuration of a vehicle body-side fixing portion of the slide door harness according to the embodiment.
Figure 4:
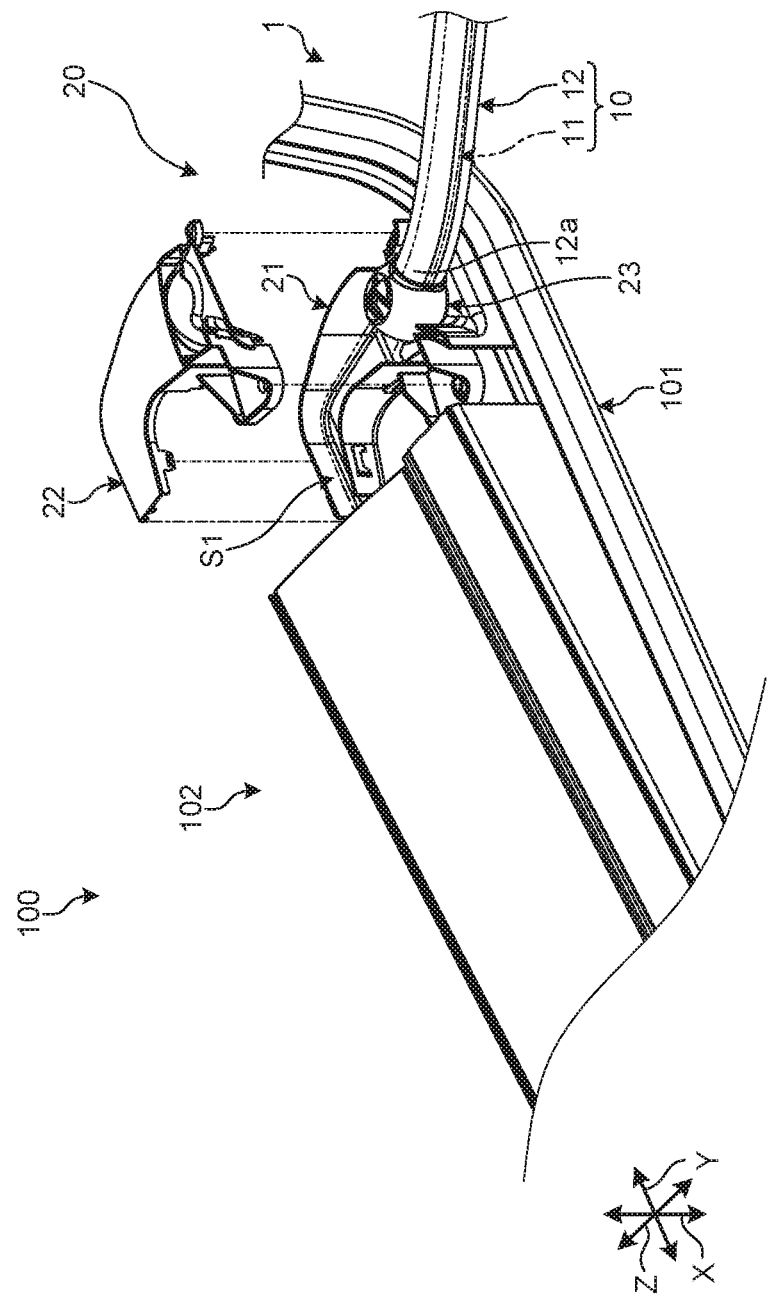
FIG. 4 is an exploded perspective view illustrating a schematic configuration of the vehicle body-side fixing portion of the slide door harness according to the embodiment.
Figure 5:
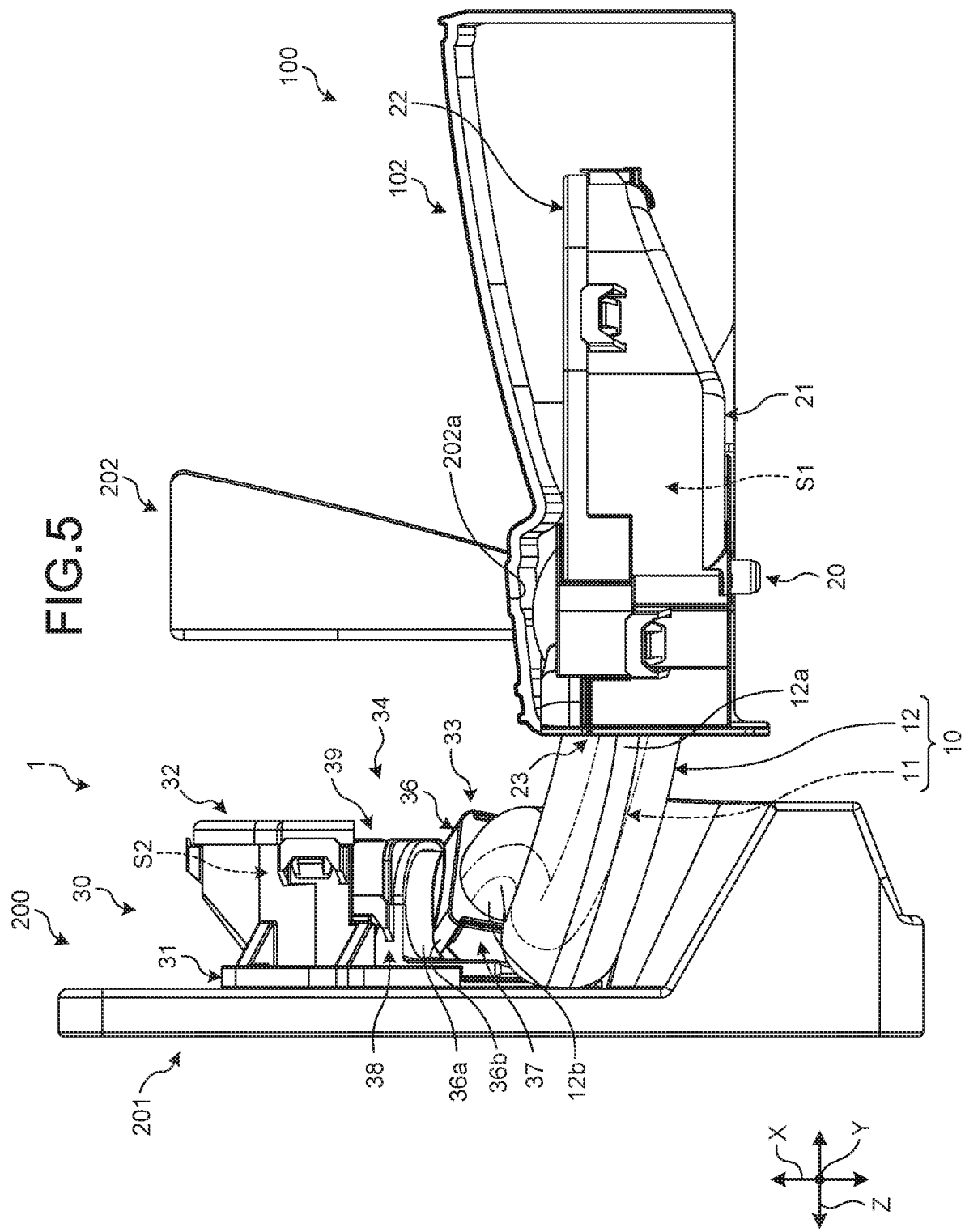
FIG. 5 is a side view illustrating a schematic configuration of the slide door harness according to the embodiment.

Specifically, as illustrated in FIGS. 3, 4, and 5, the vehicle body-side fixing portion 20 includes a base member 21, a cover member 22, and a rotation holding portion 23.

The base member 21 and the cover member 22 are members that form an insertion space S1 into which the electric wire 11 is inserted. The base member 21 and the cover member 22 are made of an insulating resin material, etc. The base member 21 is fixed to the structural member of the vehicle body 100 via a fastening member such as a bolt. The cover member 22 is assembled with the base member 21 from above in the vertical direction X. In a state in which the base member 21 and the cover member 22 are assembled together via a locking claw portion, a fastening member, etc., an inside thereof is formed in a hollow shape, and a space of the inside is included in the insertion space S1. In the vehicle body-side fixing portion 20, the electric wire 11 is inserted into the internal insertion space S1 formed by the base member 21 and the cover member 22 (see FIG. 4).

The rotation holding portion 23 is a portion that rotatably holds the one end 12a of the exterior material 12. The rotation holding portion 23 is disposed to be interposed between the base member 21 and the cover member 22 at an end of the insertion space S1 on the slide door 200 side. The rotation holding portion 23 is exposed to the slide door 200 side through an opening 102a formed in the scuff 102, and the electric wire 11 and the exterior material 12 are inserted into the insertion space S1 through the opening 102a (see FIG. 3). The rotation holding portion 23 of the present embodiment holds the end 12a of the exterior material 12 vertically below the lower end 202a of the trim 202 of the slide door 200 in the vertical direction X (see FIG. 5). The rotation holding portion 23 holds the end 12a vertically below the lower end 202a of the trim 202 in an entire process of slide movement of the slide door 200. In the vehicle body-side fixing portion 20, the electric wire 11 extending from the end 12a of the exterior material 12 held by the rotation holding portion 23 is inserted into the insertion space S1 described above.

Further, as described above, the rotation holding portion 23 of the present embodiment rotatably holds the end 12a of the exterior material 12 around at least the rotation axis along the vertical direction X. As described above, the rotation holding portion 23 can rotate the end 12a of the exterior material 12 so that the end 12a swings along the horizontal direction with slide movement of the slide door 200. Here, the rotation holding portion 23 further holds the end 12a of the exterior material 12 so that the end 12a can rotate around a different rotation axis along a direction intersecting the vertical direction X. The rotation holding portion 23 of the present embodiment includes a so-called ball joint portion having a spherical receiving shape, and supports the end 12a of the exterior material 12 so that the end 12a can rotate three-dimensionaly. According to this configuration, the vehicle body-side fixing portion 20 can suppress the exterior material 12 from being twisted due to slide movement of the slide door 200, and can reduce the stress generated in the exterior material 12 due to the twist. The rotation holding portion 23 may be formed using insulating resin material, etc., or formed using a metal material, etc. in consideration of durability.

Returning to FIGS. 1 and 2, the door-side fixing portion 30 will be described. The door-side fixing portion 30 is a portion provided in the slide door 200 to hold the other end 12b of the exterior material 12 included in the wiring material 10 so that the end 12b can rotate with slide movement of the slide door 200. The door-side fixing portion 30 is provided on the slide door 200 on the opposite side from the vehicle body-side fixing portion 20 side with the trim 202 interposed therebetween in the second cross direction Z. The door-side fixing portion 30 is located in the space between the inner panel 201 and the trim 202 in the second cross direction Z and is fixed to a surface of the inner panel 201 on the trim 202 side. The door-side fixing portion 30 is located above the vehicle body-side fixing portion 20 in the vertical direction X (see FIG. 5, etc.). The door-side fixing portion 30 of the present embodiment holds the end 12b of the exterior material 12 so that the end 12b can rotate around two axes with slide movement of the slide door 200. In this way, the door-side fixing portion 30 can rotate the end 12b of the exterior material 12 so that the end 12b swings along the horizontal direction intersecting the vertical direction X with slide movement of the slide door 200, and rotate the end 12b around the horizontal direction.

Figure 6:
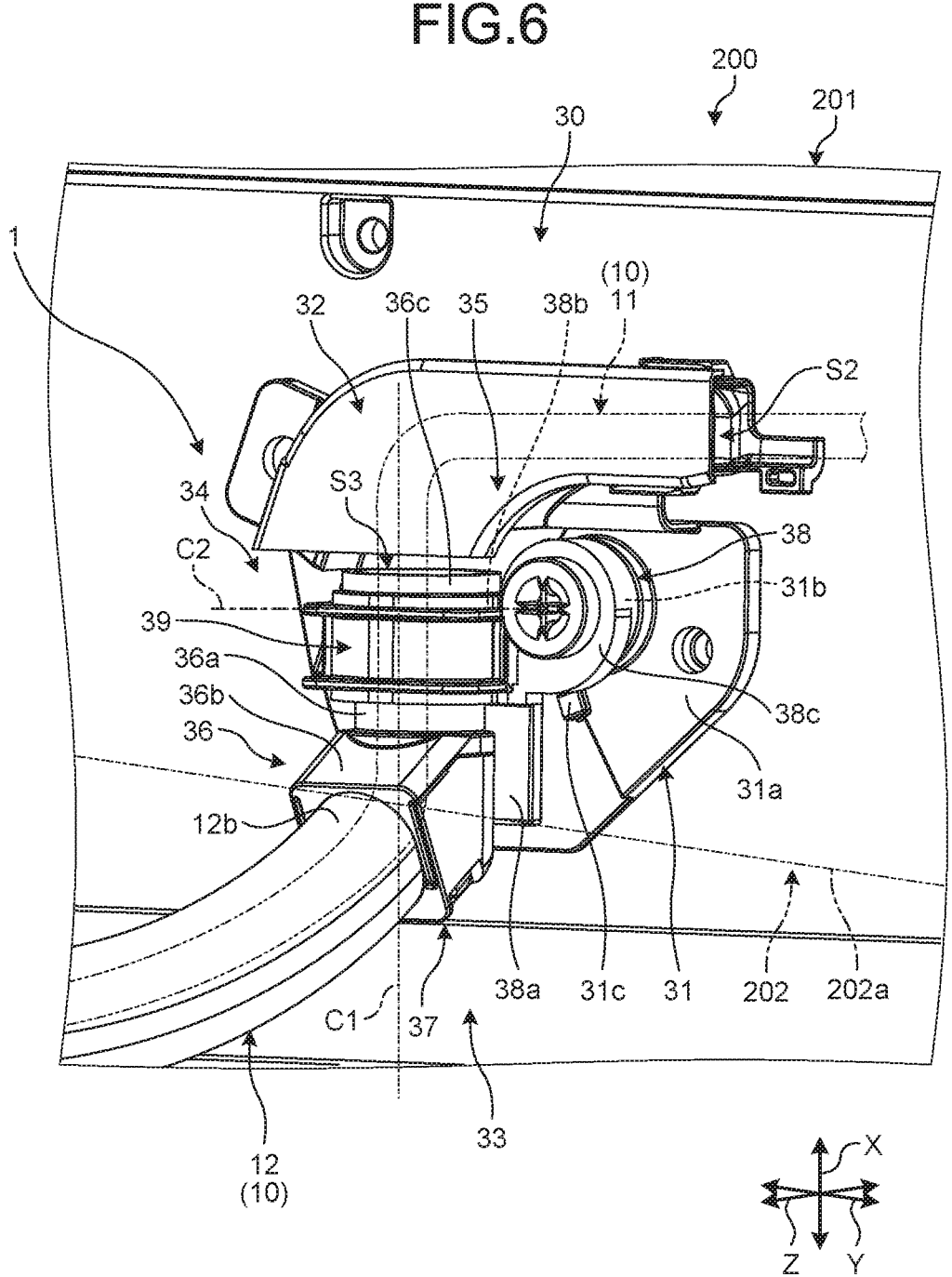
FIG. 6 is a perspective view illustrating a schematic configuration of a door-side fixing portion of the slide door harness according to the embodiment.
Figure 7:
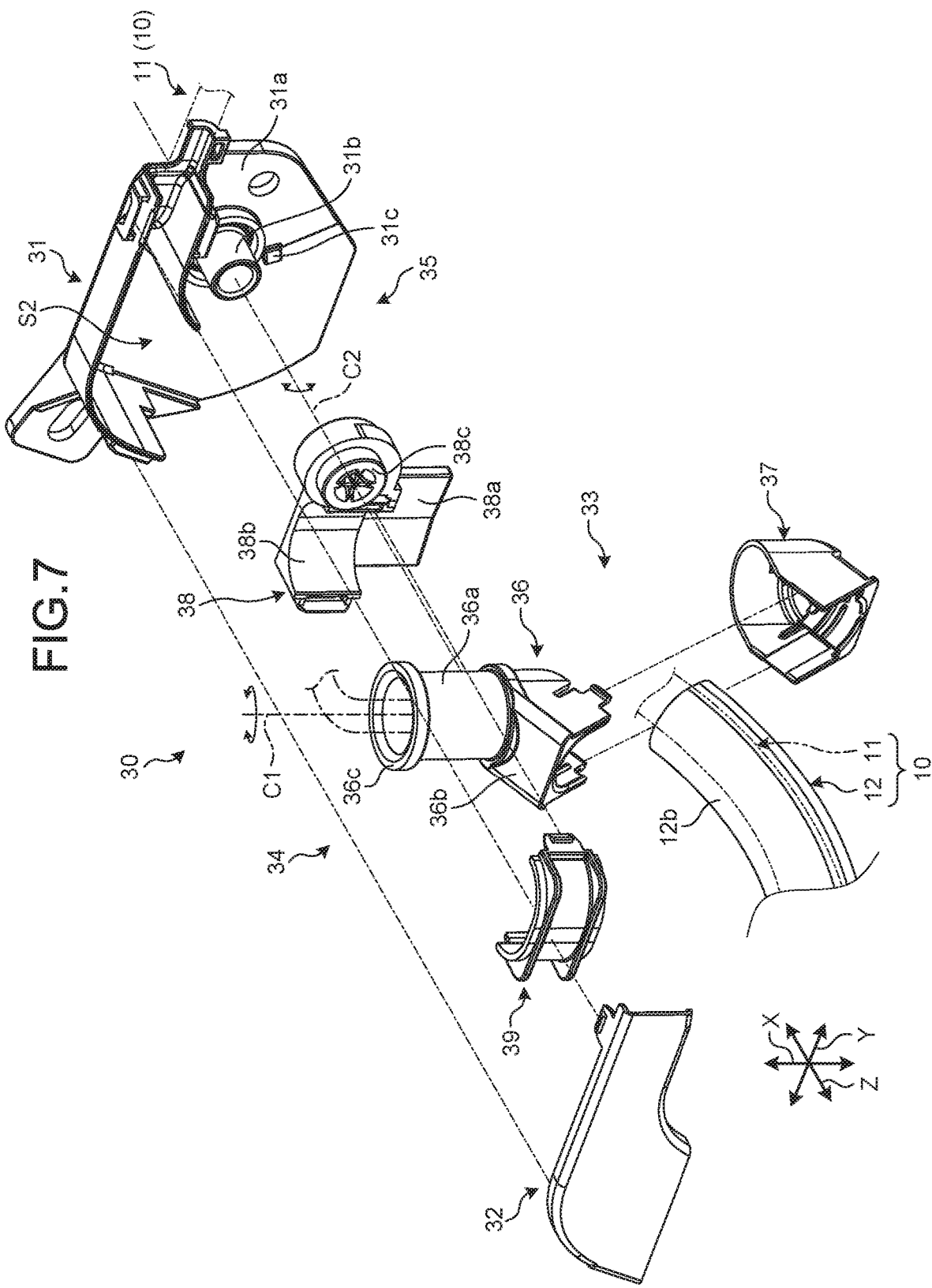
FIG. 7 is an exploded perspective view illustrating a schematic configuration of the door-side fixing portion of the slide door harness according to the embodiment.

Specifically, as illustrated in FIGS. 5, 6, and 7, the door-side fixing portion 30 includes a base member 31, a cover member 32, a holding portion 33, a first rotating shaft 34, and a second rotating shaft 35.

The base member 31 and the cover member 32 are members that form an insertion space S2 into which the electric wire 11 is inserted. The base member 31 and the cover member 32 are made of an insulating resin material, etc. In the base member 31, a plate-shaped portion 31a formed in a plate shape is fixed to a surface of the inner panel 201 on the trim 202 side via a fastening member such as a bolt. The cover member 32 is assembled with the base member 31 from one side (the trim 202 side) in the second cross direction Z. In a state in which the base member 31 and the cover member 32 are assembled together via a locking claw portion, etc., an inside thereof is formed in a hollow shape, and a space of the inside is included in the insertion space S2. In the vehicle body-side fixing portion 20, the electric wire 11 is inserted into the internal insertion space S2 formed by the base member 31 and the cover member 32 (see FIG. 6).

The holding portion 33 is a portion that holds the end 12b of the exterior material 12 toward the lower end 202a (illustrated by a two-dot chain line in FIG. 6) side of the trim 202 in the vertical direction X (see FIGS. 8 and 16, etc. described later). The holding portion 33 of the present embodiment includes a part of a first rotating member 36 and a first pressing member 37.

Here, the first rotating member 36 is a member that rotates around a first rotation axis C1. The first rotation axis C1 is an axis serving as a rotation center of rotation by the first rotating shaft 34 described later. The first rotating member 36 includes a first cylindrical portion 36a and a bracket portion 36b, and the respective portions are integrally formed by an insulating resin material, etc. The first cylindrical portion 36a is formed in a substantially cylindrical shape. In the first cylindrical portion 36a, in states illustrated in FIGS. 6 and 7, a central axis extends along the vertical direction X, and both ends are open. The central axis of the first cylindrical portion 36a corresponds to the first rotation axis C1 of the first rotating shaft 34 described later. The bracket portion 36b is formed to project from an end of the first cylindrical portion 36a located on a lower side in the vertical direction X. The bracket portion 36b obliquely projects from the first cylindrical portion 36a along a direction intersecting the central axis (first rotation axis C1) of the first cylindrical portion 36a and a perpendicular of the central axis. In this way, the bracket portion 36b is formed to project from the first cylindrical portion 36a toward the lower end 202a side of the trim 202 in the vertical direction X (see FIG. 6, etc.). The bracket portion 36b is formed in a substantially U-shaped gutter-shaped half-split shape in which a lower side in the vertical direction X is open. The first pressing member 37 is formed in a lid-like half-split shape corresponding to the shape of the bracket portion 36b. The first pressing member 37 is made of an insulating resin material, etc.

The holding portion 33 includes the bracket portion 36b and the first pressing member 37 of the first rotating member 36 configured as described above. The holding portion 33 is configured such that the bracket portion 36b and the first pressing member 37 face each other with the end 12b of the exterior material 12 interposed therebetween on the opening side of the bracket portion 36b, and side wall parts thereof are positioned to overlap each other and assembled together via a locking claw portion, etc. The holding portion 33 is formed in a substantially rectangular tubular shape in a state in which the bracket portion 36b and the first pressing member 37 are assembled together. Then, in the holding portion 33, one end of the substantially rectangular tubular shape communicates with an inside of the first cylindrical portion 36a, the other end is open, and the end 12b of the exterior material 12 is interposed and held in the opening. That is, in the holding portion 33, in a state in which the bracket portion 36b and the first pressing member 37 are located to face each other and assembled together via the locking claw portion, etc., the end 12b of the exterior material 12 are interposed and held by the bracket portion 36b and the first pressing member 37. An end of the holding portion 33 on a side holding the end 12b of the exterior material 12 faces the lower end 202a side of the trim 202 in the vertical direction X (see FIG. 6, etc.). According to this configuration, the holding portion 33 can hold the end 12b of the exterior material 12 toward the lower end 202a side of the trim 202 in the vertical direction X.

In addition, in the holding portion 33, in the state where the bracket portion 36b and the first pressing member 37 are assembled together, an inside thereof is formed in a hollow shape, and a space of the inside communicates with the inside of the first cylindrical portion 36a to form an insertion space S3. The insertion space 33 communicates with the insertion space S2 described above. In the door-side fixing portion 30, the electric wire 11 extending from the end 12b of the exterior material 12 held by the holding portion 33 is inserted into the insertion space S3, and subsequently inserted into the insertion space S2 described above.

The first rotating shaft 34 is a portion that allows the holding portion 33 to rotate around the first rotation axis C1. The first rotating shaft 34 of the present embodiment includes a part of the above-described first rotating member 36, a second rotating member 38, and a second pressing member 39.

Here, the second rotating member 38 is a member that rotates around a second rotation axis C2. The second rotation axis C2 is an axis serving as a rotation center of rotation by the second rotating shaft 35 described later. The second rotating member 38 includes a plate-shaped portion 38a, a first bearing 38b, and a second bearing 38c, and the respective portions are integrally formed by an insulating resin material, etc. The plate-shaped portion 38a is formed in a substantially rectangular plate shape whose plate thickness direction extends along the second cross direction Z, and extends along the vertical direction X and the first cross direction Y. The first bearing 38b is formed at an upper end of the plate-shaped portion 38a in the vertical direction X and an end on one side (fully open position side) in the first cross direction Y. The first bearing 38b is formed in a substantially semicircular gutter-shaped half-split shape in which one side (the trim 202 side) in the second cross direction Z is open. The second bearing 38c is formed adjacent to the other side (fully closed position side) of the first bearing 38b in the first cross direction Y. That is, the second bearing 38c is formed at an upper end of the plate-shaped portion 38a in the vertical direction X and an end on the other side (fully closed position side) in the first cross direction Y. The second bearing 38c is formed in a substantially cylindrical shape. In the second bearing 38c, a central axis extends along the second cross direction Z, one side (trim 202 side) is closed, and the other side (inner panel 201 side) is open. The second pressing member 39 is formed a substantially half-circle gutter-shaped half-split shape in which the other side (inner panel 201 side) in the second cross direction Z is open corresponding to the shape of the first bearing 38b. The second pressing member 39 is made of an insulating resin material, etc.

The first rotating shaft 34 includes the first cylindrical portion 36a of the first rotating member 36 described above, the first bearing 38b of the second rotating member 38 configured as described above, and the second pressing member 39. The first rotating shaft 34 is configured such that the first bearing 38b and the second pressing member 39 face each other with the first cylindrical portion 36a interposed therebetween on the opening side and are assembled together via a locking claw portion, etc. The first bearing 38b and the second pressing member 39 are formed in a substantially cylindrical shape in a state in which the first bearing 38b and the second pressing member 39 are assembled together. Further, the first rotating shaft 34 interposes and holds the first cylindrical portion 36a inside the substantially cylindrical first bearing 38b and the second pressing member 39. That is, in the first rotating shaft 34, in a state in which the first bearing 38b and the second pressing member 39 are located to face each other and assembled together via the locking claw portion, etc., the first cylindrical portion 36a is interposed and held by the first bearing 38b and the second pressing member 39. According to this configuration, the first rotating shaft 34 can support the first rotating member 36 including the first cylindrical portion 36a and the first pressing member 37 such that the first rotating member 36 and the first pressing member 37 can rotate around the first rotation axis C1 with the central axis of the first cylindrical portion 36a as the first rotation axis C1. As a result, the first rotating shaft 34 can allow the holding portion 33 holding the end 12b of the exterior material 12 to rotate around the first rotation axis C1 via the first cylindrical portion 36a. In the states illustrated in FIGS. 6 and 7, the first rotating shaft 34 rotatably holds the holding portion 33 around the first rotation axis C1 in a positional relationship in which the central axis of the first cylindrical portion 36a extends along the vertical direction X, that is, in a positional relationship in which the first rotation axis C1 extends along the vertical direction X. The direction along which the first rotation axis C1 of the first rotating shaft 34 (in other words, the central axis of the first cylindrical portion 36a) extends changes with rotation by the second rotating shaft 35 described later.

Note that a retaining convex portion 36c is formed on an outer peripheral surface of an upper end of the first cylindrical portion 36a in the vertical direction X. According to this configuration, the first rotating member 36 is configured not to fall off from the first hearing 38b and the second pressing member 39 by the retaining convex portion 36c in a state in which the first cylindrical portion 36a is held by the first bearing 38b and the second pressing member 39.

The second rotating shaft 35 is a portion that allows the holding portion 33 and the first rotating shaft 34 to integrally rotate around the second rotation axis C2 intersecting the first rotation axis C1. The second rotating shaft 35 of the present embodiment includes a part of the above-described base member 31 and a part of the second rotating member 38.

Here, the base member 31 includes a second cylindrical portion 31b formed adjacent to a fully closed position side of a part forming the insertion space S2 in the first cross direction Y. The second cylindrical portion 31b is formed to project from the plate-shaped portion 31a toward the trim 202 side along the second cross direction Z. The second cylindrical portion 31b is formed in a substantially cylindrical shape. In the second cylindrical portion 31b, a central axis extends along the second cross direction Z and both ends are open. The central axis of the second cylindrical portion 31b corresponds to the second rotation axis C2 of the second rotating shaft 35.

The second rotating shaft 35 includes the second bearing 38c of the second rotating member 38 described above and the second cylindrical portion 31b of the base member 31 configured as described above. The second rotating shaft 35 is configured by inserting the second cylindrical portion 31b into the second bearing 38c along the second cross direction Z. According to this configuration, the second rotating shaft 35 can support the entire second rotating member 38 including the plate-shaped portion 38a, the first bearing 38b, and the second bearing 38c such that the second rotating member 38 can rotate around the second rotation axis C2 with the central axis of the second cylindrical portion 31b as the second rotation axis C1. Further, the second rotating shaft 35 can integrally support the second pressing member 39, the first rotating member 36, and the first pressing member 37 supported by the second rotating member 38 such that the members can rotate around the second rotation axis C2. As a result, the second rotating shaft 35 can allow the holding portion 33 holding the end 12b of the exterior material 12 and the first rotating member 36 included in the holding portion 33 to rotate around the second rotation axis C2 as a whole via the second rotating member 38. The direction along which the second rotation axis C2 of the second rotating shaft 35 (in other word, the central axis of the second cylindrical portion 31b) extends is fixed at a position along the second cross direction Z (horizontal direction) and does not change.

In addition, as illustrated in FIGS. 6 and 7, the door-side fixing portion 30 of the present embodiment has a rotation restricting portion 31c. The rotation restricting portion 31c is a portion that restricts rotation around the second rotation axis S2 by the second rotating shaft 35 due to slide movement at a predetermined position. The rotation restricting portion 31c of the present embodiment is formed on the base member 31 as a protrusion. The rotation restricting portion 31c is formed to project from the base member 31 toward the trim 202 side in the second cross direction Z. Here, the rotation restricting portion 31c is formed adjacent, to the lower side of the second cylindrical portion 31b in the vertical direction X and has a substantially rectangular columnar shape. The rotation restricting portion 31c comes into contact with an end surface of the plate-shaped portion 38a of the second rotating member 38 on the fully closed position in the first cross direction Y at a predetermined position with slide movement of the slide door 200 from the fully closed position side to the fully open position side. In this way, the rotation restricting portion 31c can restrict rotation around the second rotation axis S2 by the second rotating shaft 35 at a predetermined position. A predetermined position where the rotation restricting portion 31c and the plate-shaped portion 38a come into contact with each other will be described in detail later.

The door-side fixing portion 30 configured as described above can rotate the holding portion 33 around the first rotation axis C1 by the first rotating shaft 34 in a state in which the end 12b of the exterior material 12 is held toward the lower end 202a side of the trim 202 by the holding portion 33. According to this configuration, the door-side fixing portion 30 can rotate the holding portion 33 together with the end 12b of the exterior material 12 so that the holding portion 33 and the end 12b swing in an accurate trajectory along the horizontal direction around the first rotation axis C1 by the first rotating shaft 34 with slide movement of the slide door 200. Further, the door-side fixing portion 30 can rotate the holding portion 33 holding the end 12b of the exterior material 12 and the first rotating member 36 included in the holding portion 33 as a whole around the second rotation axis C2 along the second cross direction Z (horizontal direction) by the second rotating shaft 35. As a result, the door-side fixing portion 30 can swing and rotate the first rotation axis C1 of the first rotating shaft 34 in an accurate trajectory along the first cross direction Y with rotation around the second rotation axis C2 by the second rotating shaft 35. That is, the door-side fixing portion 30 can swing and rotate the holding portion 33 holding the end 12b of the exterior material 12 as a whole in an accurate trajectory along the first cross direction Y on a lower side of the second rotating shaft 35 in the vertical direction X with rotation around the second rotation axis C2 by the second rotating shaft 35.

According to the above configuration, the door-side fixing portion 30 can rotatably support the first rotating member 36 included in the holding portion 33 on the second rotating member 38, and rotatably support the second rotating member 38 on the base member 31. In this way, the door-side fixing portion 30 can rotate the holding portion 33 holding the end 12b of the exterior material 12 on two axes by the first rotating shaft 34 and the second rotating shaft 35. As a result, the door-side fixing portion 30 can hold the end 12b of the exterior material 12 so that the end 12b can rotate around two axes of the first rotation axis C1 and the second rotation axis C2 with slide movement of the slide door 200.

Figure 8:
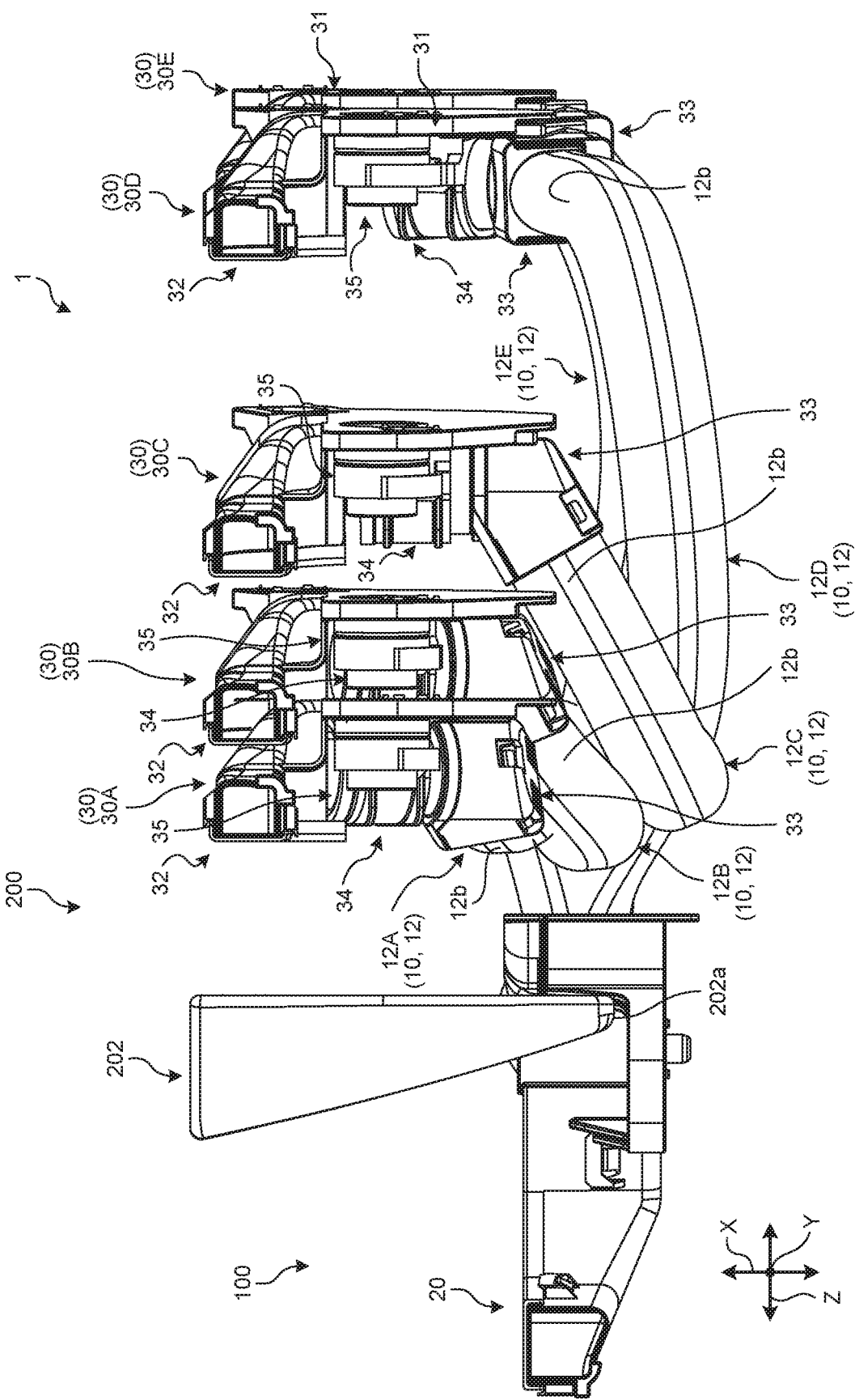
FIG. 8 is a schematic side view illustrating a series of operations of the slide door harness according to the embodiment.

Further, as illustrated in FIG. 8, the door-side fixing portion 30 avoids interference between the exterior material 12 and the lower end 202a of the trim 202 by changing a holding position of the end 12b of the exterior material 12 with slide movement of the slide door 200. In this case, the door-side fixing portion 30 changes the holding position of the end 12b of the exterior material 12 by combining rotation arounds the first rotation axis C1 by the first rotating shaft 34 and rotation around the second rotation axis C2 by the second rotating shaft 35 with slide movement of the slide door 200.

FIG. 8 illustrates the slide door 200 at the fully closed position. In addition, in FIG. 8, the exterior material 12 and the door-side fixing portion 30 in a state in which the slide door 200 is at the fully closed position are illustrated by an "exterior material 12A" and a "door-side fixing portion 30A", respectively. In addition, in FIG. 8, the exterior material 12 and the door-side fixing portion 30 in a state in which the slide door 200 is at the fully open position are illustrated by an "exterior material 12E" and a "door-side fixing portion 30E", respectively. In addition, in FIG. 8, the exterior material 12 and the door-side fixing portion 30 in a state in which the slide door 200 is at a first intermediate position between the fully closed position and the fully open position are illustrated by an "exterior material 12B" and a "door-side fixing portion 30B", respectively. In addition, in FIG. 8, the exterior material 12 and the door-side fixing portion 30 in a state in which the slide door 200 is at a second intermediate position between the fully closed position and the fully open position are illustrated by an "exterior material 12C" and a "door-side fixing portion 30C", respectively. In addition, in FIG. 8, the exterior material 12 and the door-side fixing portion 30 in a state in which the slide door 200 is at a third intermediate position between the fully closed position and the fully open position are illustrated by an "exterior material 12D" and a "door-side fixing portion 30D", respectively.

The door-side fixing portion 30 rotates the end 12b of the exterior material 12 downward in the vertical direction X with slide movement of the slide door 200 from the fully closed position side to the fully open position side by combining rotation by the first rotating shaft 34 and rotation by the second rotating shaft 35. In this way, for example, the door-side fixing portion 30B holds the end 12b of the exterior material 12B at a position below a holding position of the end 12b of the exterior material 12A by the door-side fixing portion 30A in the vertical direction X. Similarly, the door-side fixing portion 30C holds the end 12b of the exterior material 12C at a position below a holding position of the end 12b of the exterior material 12B by the door-side fixing portion 30B in the vertical direction X.

Meanwhile, the door-side fixing portion 30 rotates the end 12b of the exterior material 12 upward in the vertical direction X with slide movement of the slide door 200 from the fully open position side to the fully closed position side by combining rotation by the first rotating shaft 34 and rotation by the second rotating shaft 35. In this way, for example, the door-side fixing portion 30B holds the end 12b of the exterior material 12B at a position above a holding position of the end 12b of the exterior material 12C by the door-side fixing portion 30C in the vertical direction X. Similarly, the door-side fixing portion 30A holds the end 12b of the exterior material 12A at a position above a holding position of the end 12b of the exterior material 12B by the door-side fixing portion 30B in the vertical direction X.

Hereinafter, the operation of the slide door harness 1 configured as described above will be described in more detail with reference to FIGS. 9 to 24. Hereinafter, first, an operation when the slide door 200 slides from the fully closed position to the fully open position will be described, and then an operation when the slide door 200 slides from the fully open position to the fully closed position will be described.

Figure 9:
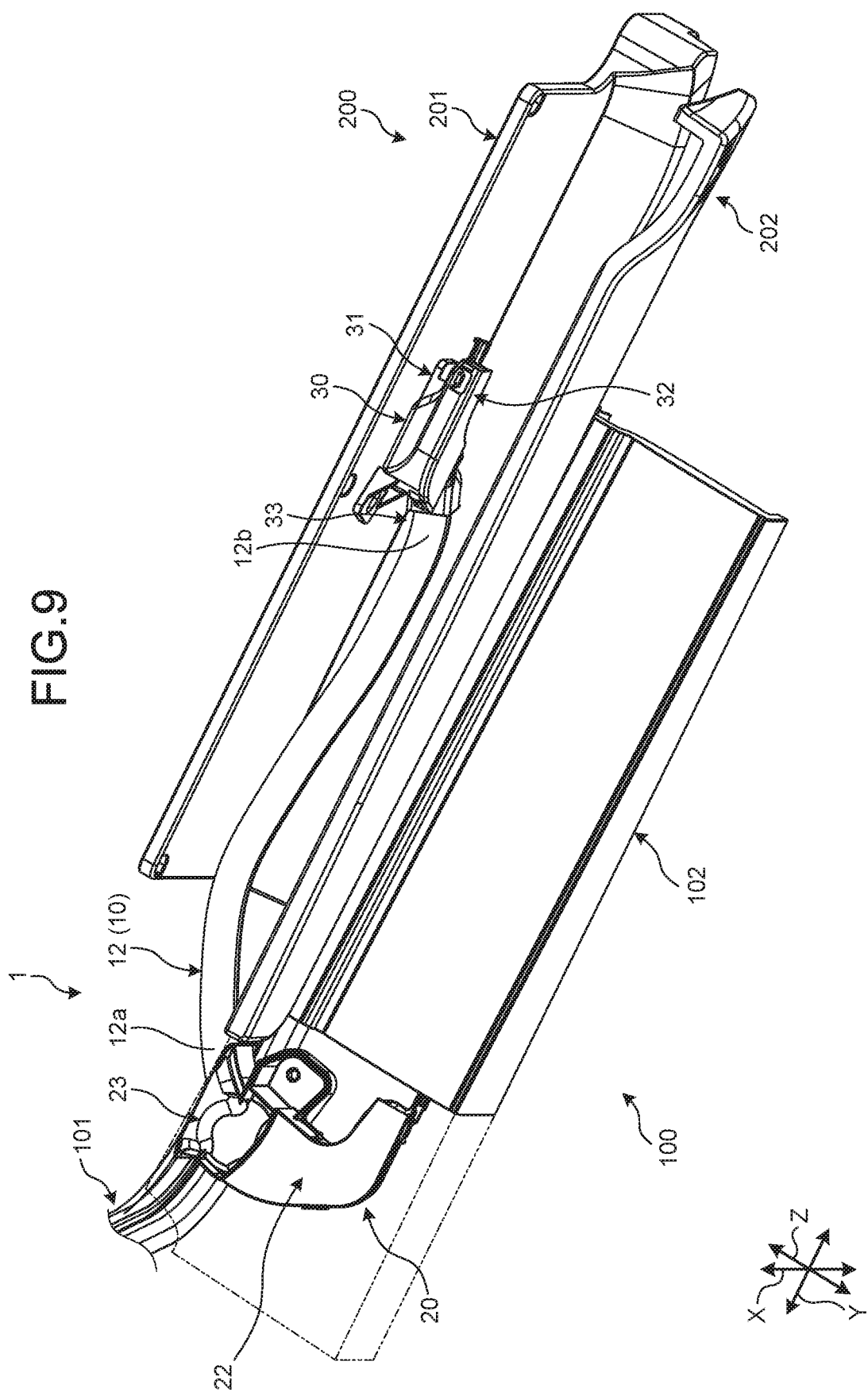
FIG. 9 is a perspective view illustrating a state of the slide door harness according to the embodiment at a fully closed position.
Figure 10:
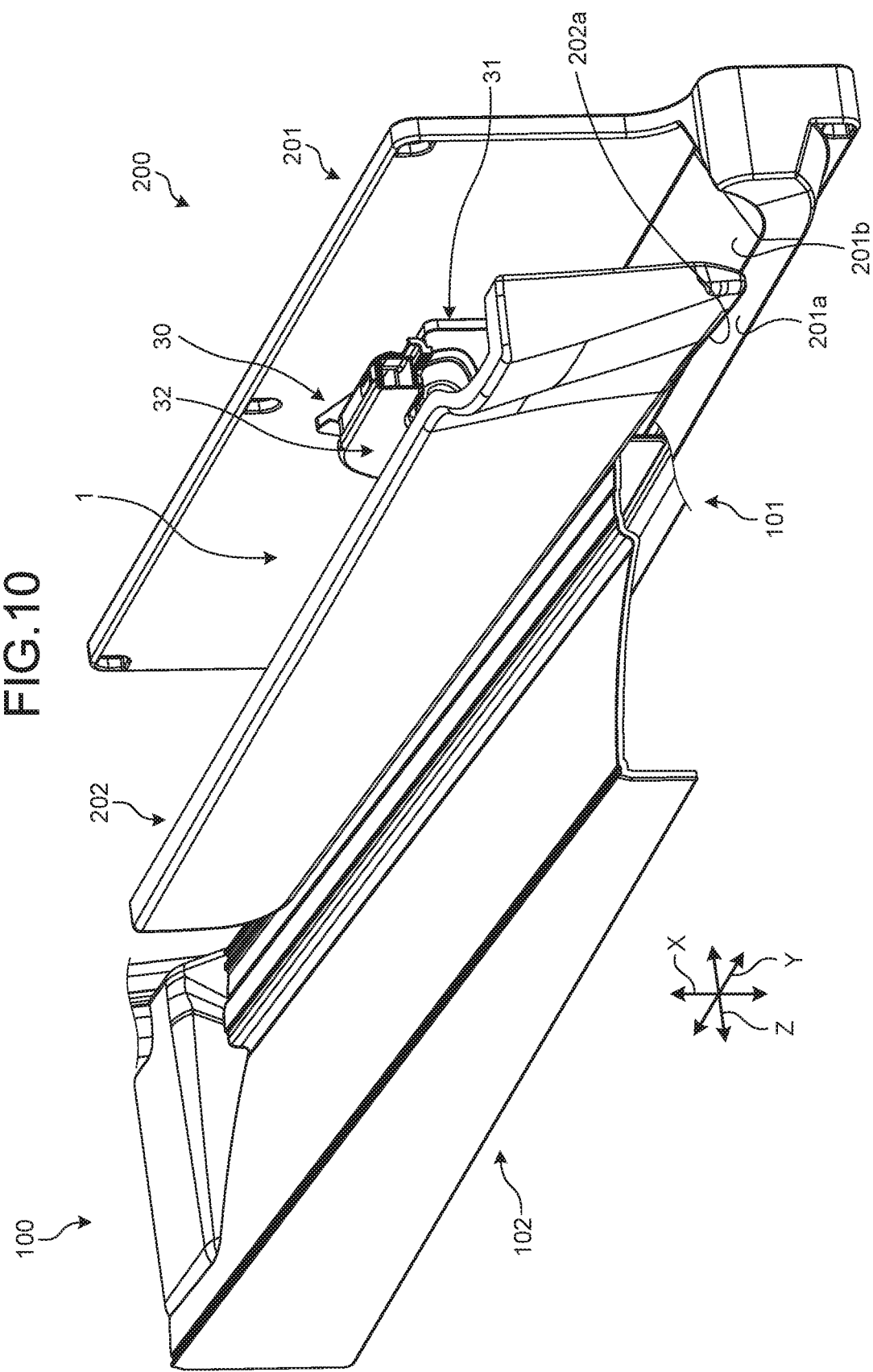
FIG. 10 is a schematic perspective view illustrating a state of the slide door harness according to the embodiment at the fully closed position.
Figure 11:
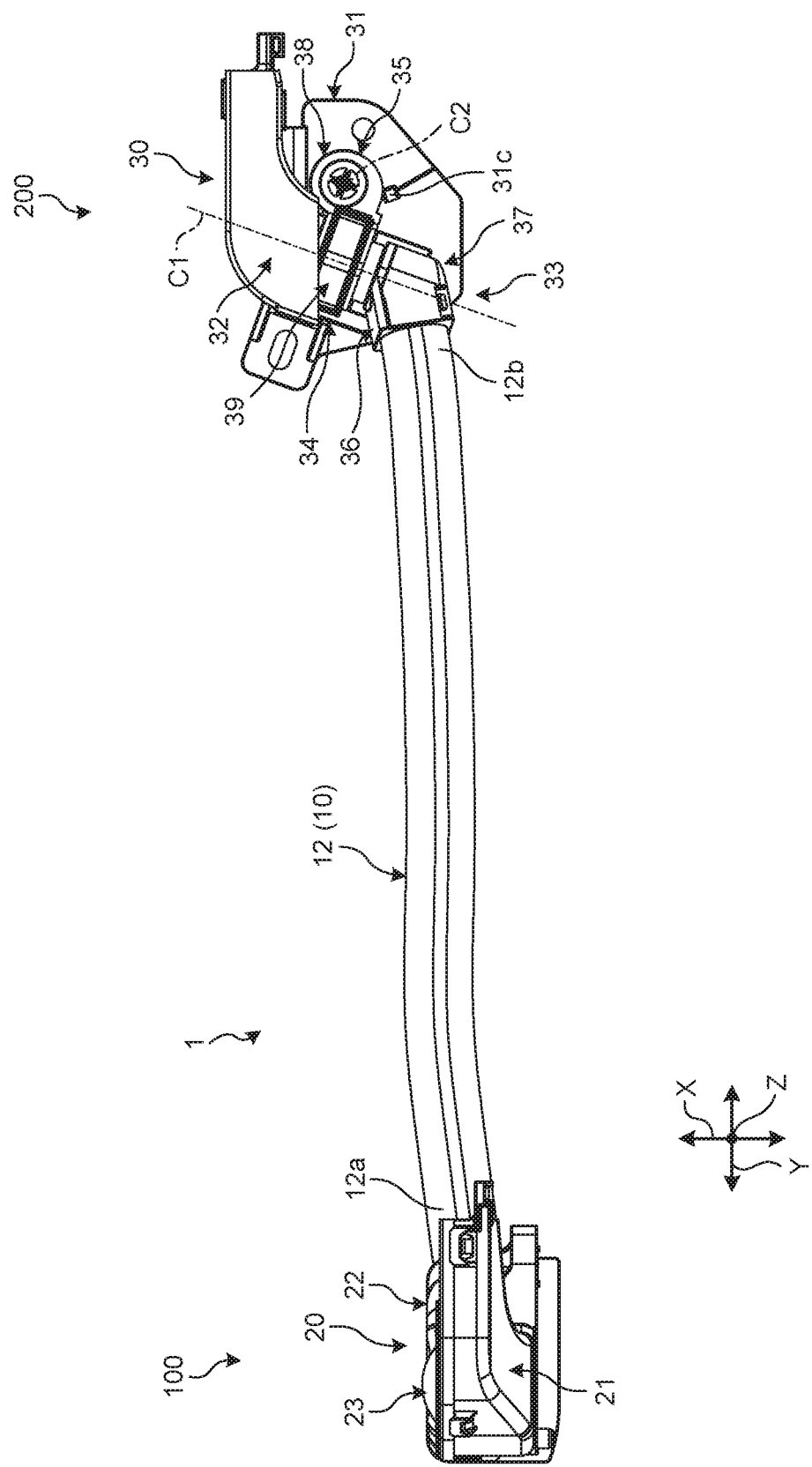
FIG. 11 is a schematic front view illustrating a state of the slide door harness according to the embodiment at the fully closed position.

Operation When Slide Door 200 Slides From Fully Closed Position to Fully Open Position FIGS. 9, 10, and 11 illustrate a state in which the slide door 200 is at the fully closed position. At the fully closed position, the slide door 200 is close to the vehicle body 100 in the second cross direction Z and closes the opening, and the protrusion 201a of the inner panel 201 is brought into close contact with and pressed against the weather strip 101. Further, at the fully closed position, as described above, the door-side fixing portion 30 lifts the end 12b of the exterior material 12 to a relatively upper position in the vertical direction X and holds the end 12b. According to this configuration, at the fully closed position, the door-side fixing portion 30 holds the end 12b of the exterior material 12 above the lower end 202a of the trim 202 in the vertical direction X (see the door-side fixing portion 30A and the exterior material 12A of FIG. 8). Further, at the fully closed position, the door-side fixing portion 30 is in a state in which substantially the entire exterior material 12 is located on the door-side fixing portion 30 side of the trim 202 and is housed on the inner panel 201 side of the trim 202. In addition, at the fully closed position, the door-side fixing portion 30 is in a state in which the rotation restricting portion 31c does not come into contact with the second rotating member 38 and rotation around the second rotation axis C2 by the second rotating shaft 35 is allowed in this state, the first rotation axis C1 of the first rotating shaft 34 is inclined with respect to the vertical direction X and the first cross direction Y. More specifically, in this state, when viewed along the second cross direction Z (see viewing in the second cross direction of FIG. 11), the first rotation axis C1 of the first rotating shaft 34 is inclined with respect to the vertical direction X such that a lower side is shifted to the fully open position side in the first cross direction Y and an upper side is shifted to the fully closed position side in the first cross direction Y. Further, in this state, in the door-side fixing portion 30, a lower end of the holding portion 33 and the end 12b of the exterior material 12 face the fully open position side (vehicle body-side fixing portion 20 side) in the first cross direction Y.

Figure 12:
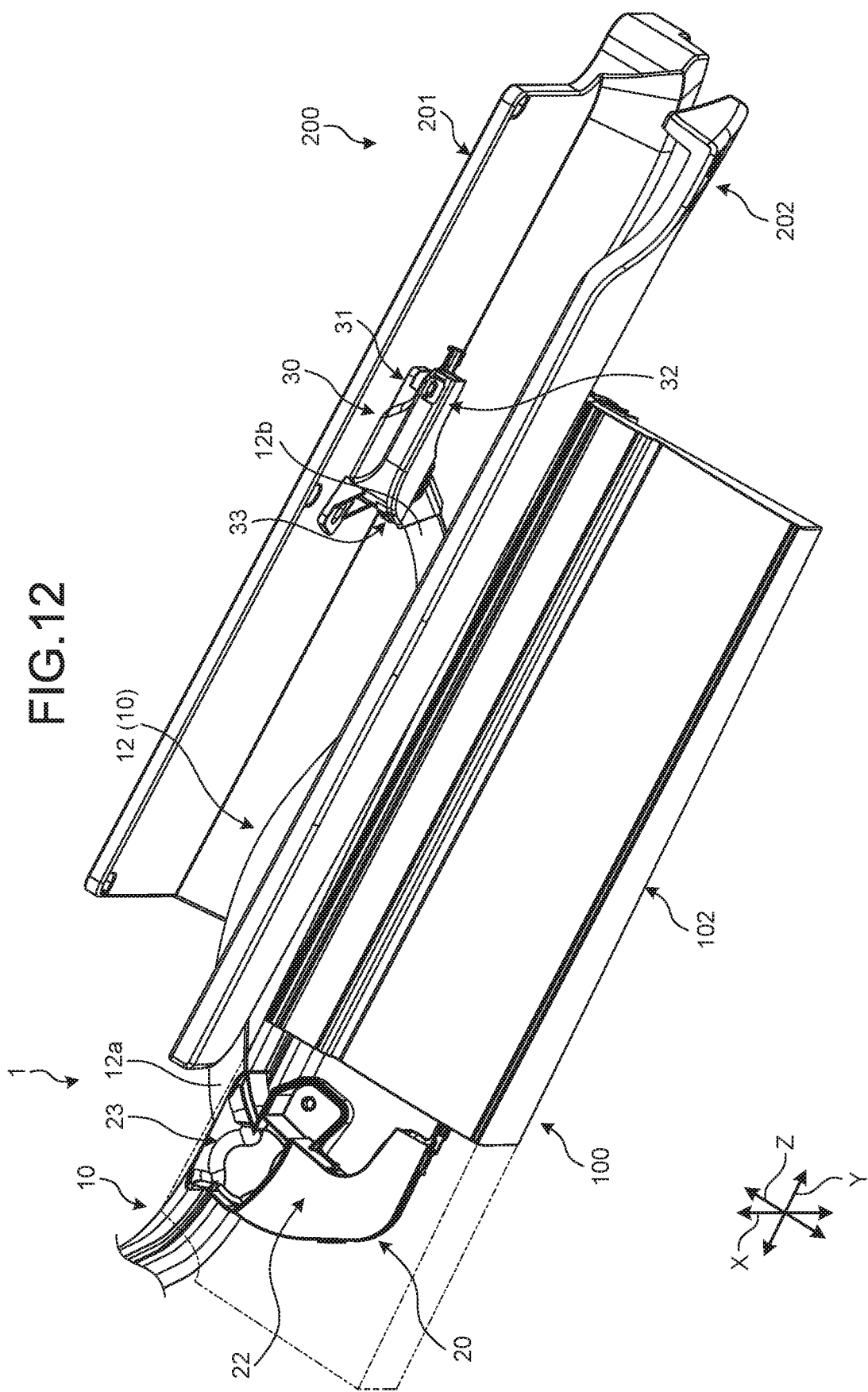
FIG. 12 is a perspective view illustrating a state of the slide door harness according to the embodiment at a first intermediate position.
Figure 13:
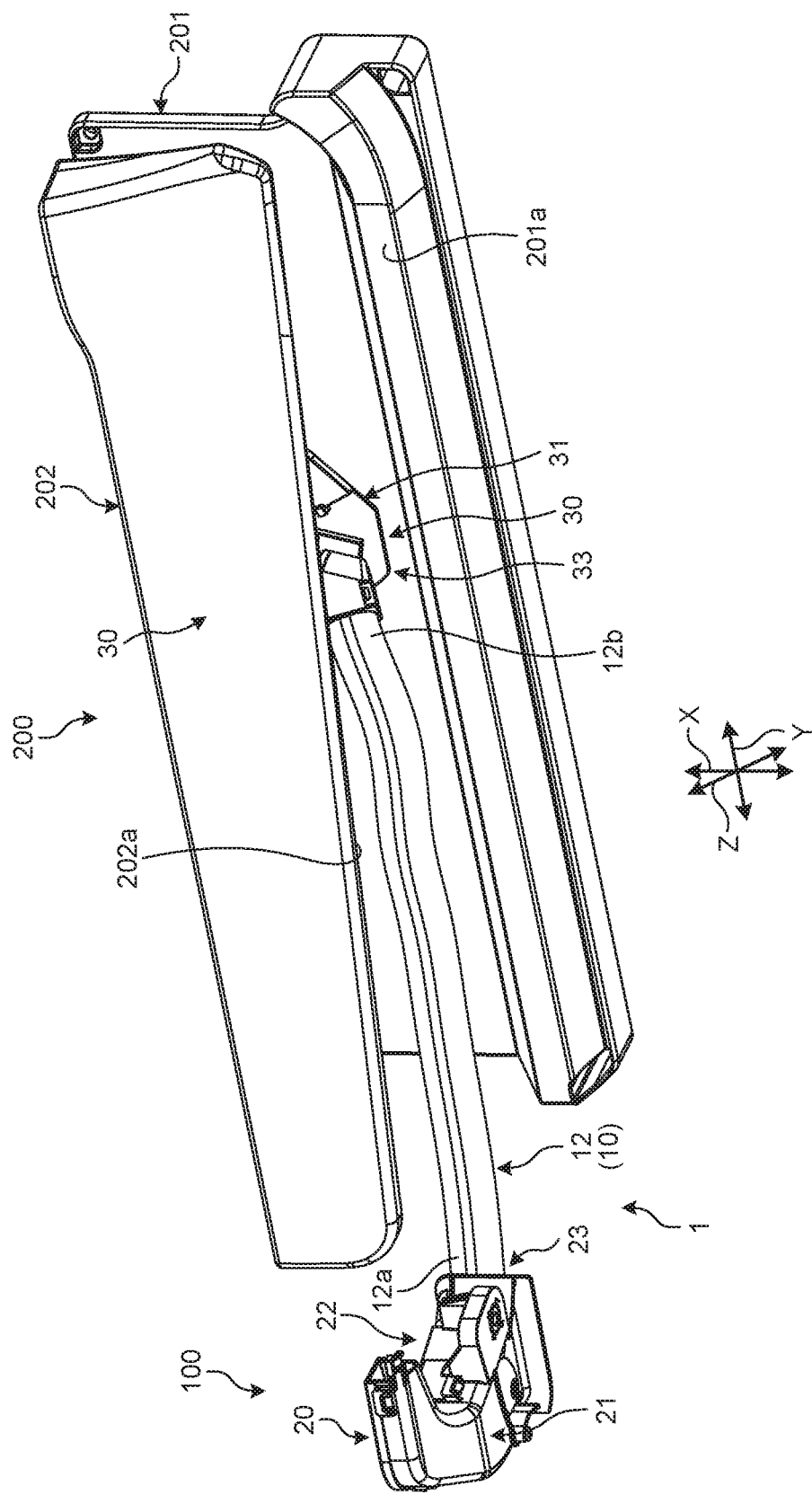
FIG. 13 is a schematic perspective view illustrating a state of the slide door harness according to the embodiment at the first intermediate position.
Figure 14:
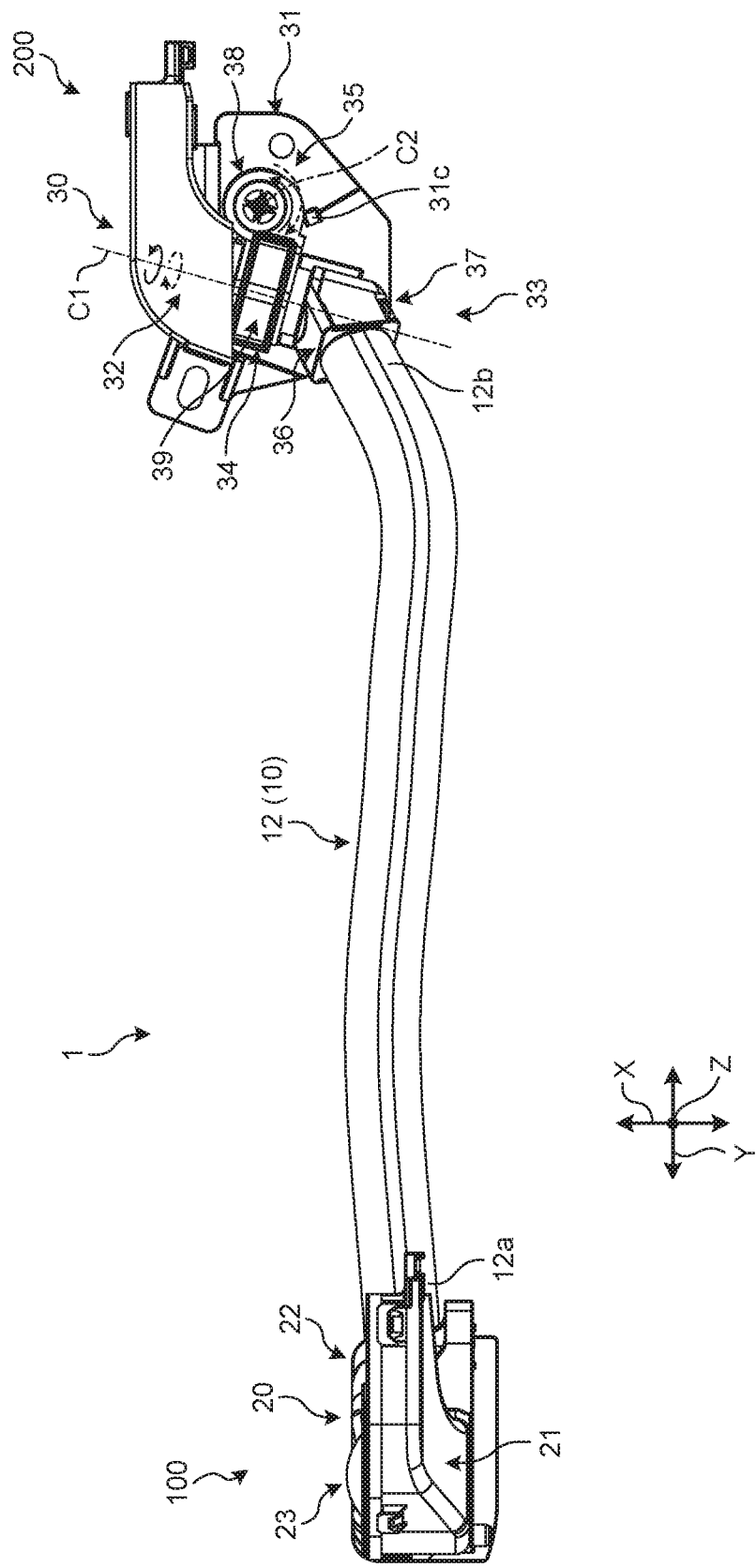
FIG. 14 is a schematic front view illustrating a state of the slide door harness according to the embodiment at the first intermediate position.

When the slide door 200 slides from a fully closed position state to the first intermediate position illustrated in FIGS. 12, 13, and 14, while the door-side fixing portion 30 approaches the vehicle body-side fixing portion 20 side with this slide movement, the holding portion 33 is pulled by the exterior material 12. As a result, in the door-side fixing portion 30, rotation arounds the first rotation axis C1 by the first rotating shaft 34 and rotation around the second rotation axis C2 by the second rotating shaft 35 are started, and the holding position of the end 12b of the exterior material 12 by the holding portion 33 changes. In this case, the second rotating shaft 35 rotates the second rotating member 38 together with the holding portion 33 to the fully closed position side in the first cross direction Y around the second rotation axis C2 (counterclockwise side around the second rotation axis C2 as indicated by a solid arrow in FIG. 14). Then, the first rotating shaft 34 rotates the first rotating member 36 and the first pressing member 37 included in the holding portion 33 to the fully closed position side in the first cross direction Y around the first rotation axis C1 (counterclockwise side around the first rotation axis C1 as indicated by a solid arrow in FIG. 14). In this way, when compared to a state in which the slide door 200 is at the fully closed position, the door-side fixing portion 30 rotates the lower end of the holding portion 33 and the end 12b of the exterior material 12 downward in the vertical direction X. As a result, when compared to the state in which the slide door 200 is at the fully closed position, the door-side fixing portion 30 moves the holding position of the end 12b of the exterior material 12 by the holding portion 33 downward in the vertical direction X. In this state, from a state in which the exterior material 12 is housed between the trim 202 and the inner panel 201, the end 12a side starts to be gradually pulled out to the vehicle body-side fixing portion 20 side via the lower side of the lower end 202a of the trim 202. In addition, in this state, the first rotation axis C1 of the first rotating shaft 34 is still in a state of being inclined with respect to the vertical direction X and the first cross direction Y. In this state, the door-side fixing portion 30 starts to face the fully closed position side in the first cross direction Y from a state in which the lower end of the holding portion 33 and the end 12b of the exterior material 12 are at the fully closed position.

Figure 15:
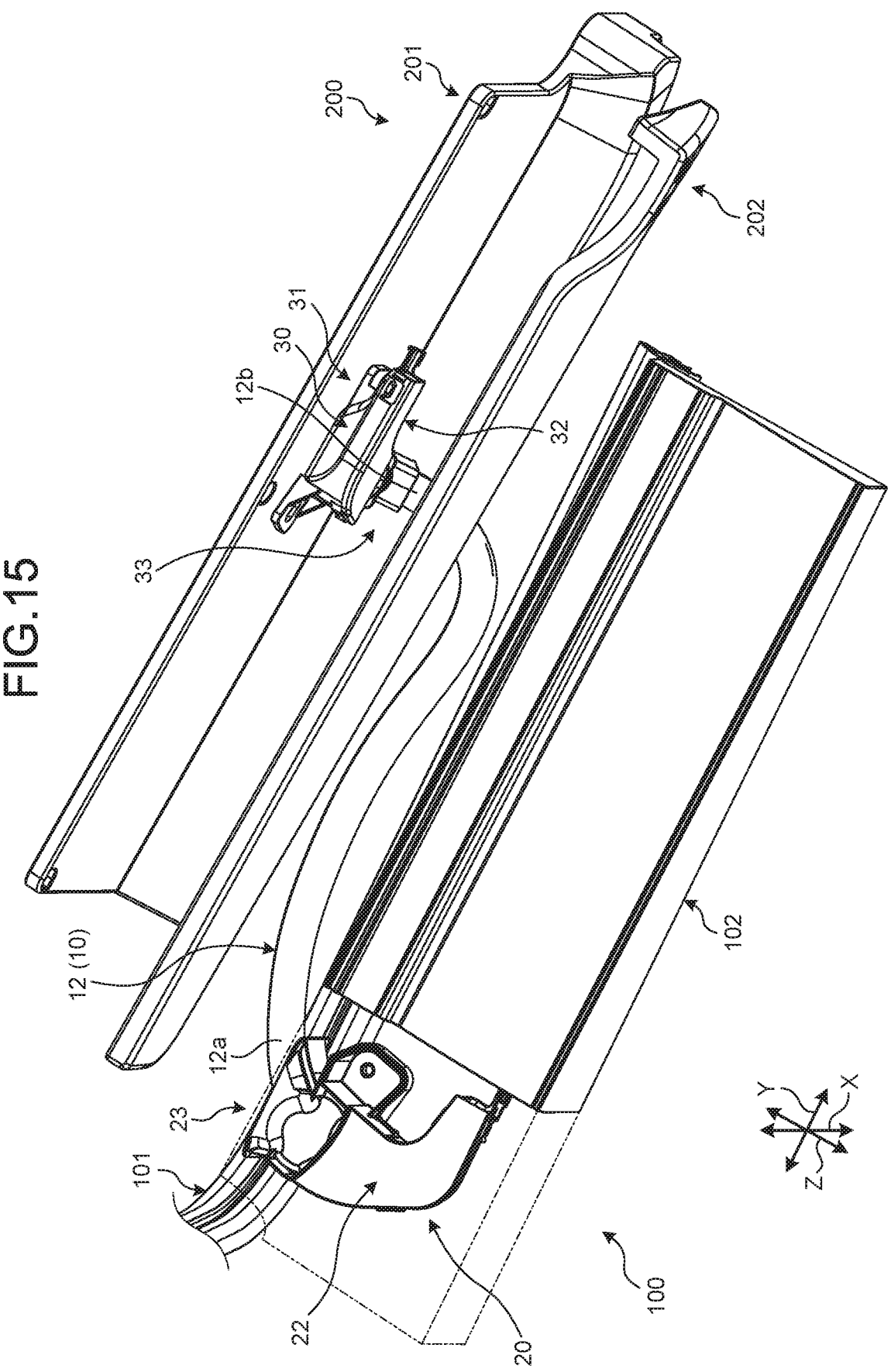
FIG. 15 is a perspective view illustrating a state of the slide door harness according to the embodiment at a second intermediate position.
Figure 16:
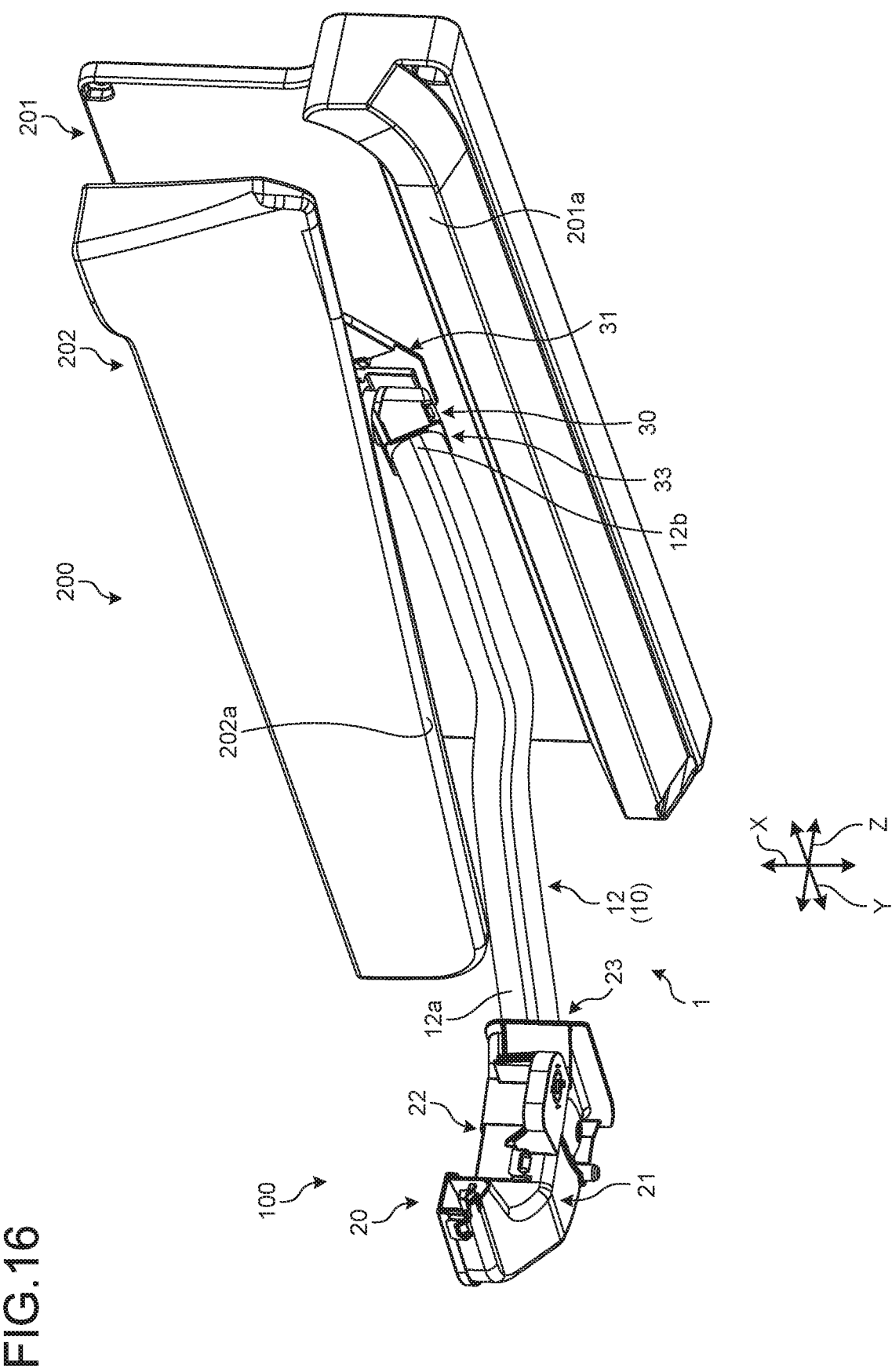
FIG. 16 is a schematic perspective view illustrating a state of the slide door harness according to the embodiment at the second intermediate position.
Figure 17:
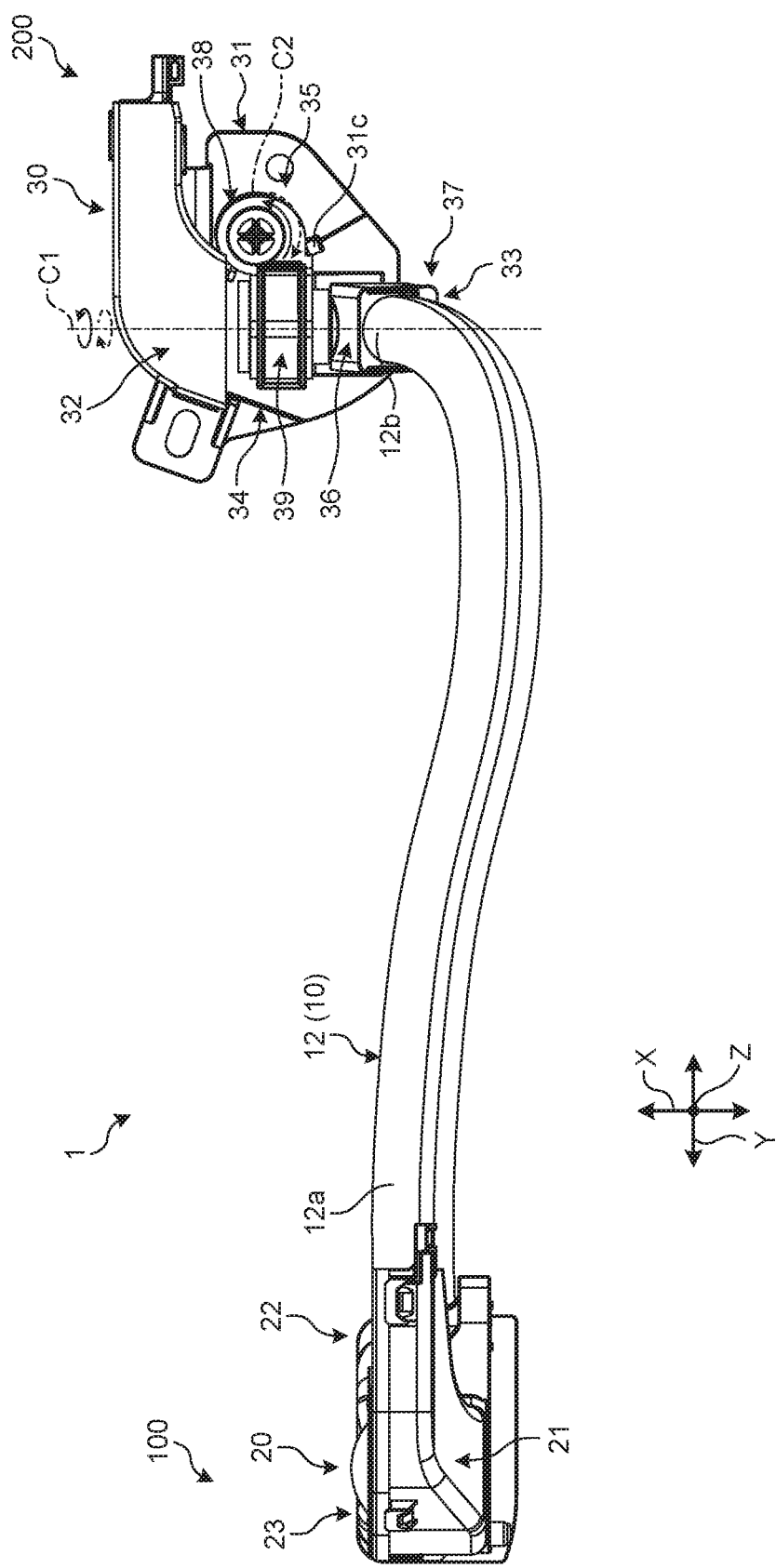
FIG. 17 is a schematic front view illustrating a state of the slide door harness according to the embodiment at the second intermediate position.
Figure 18:
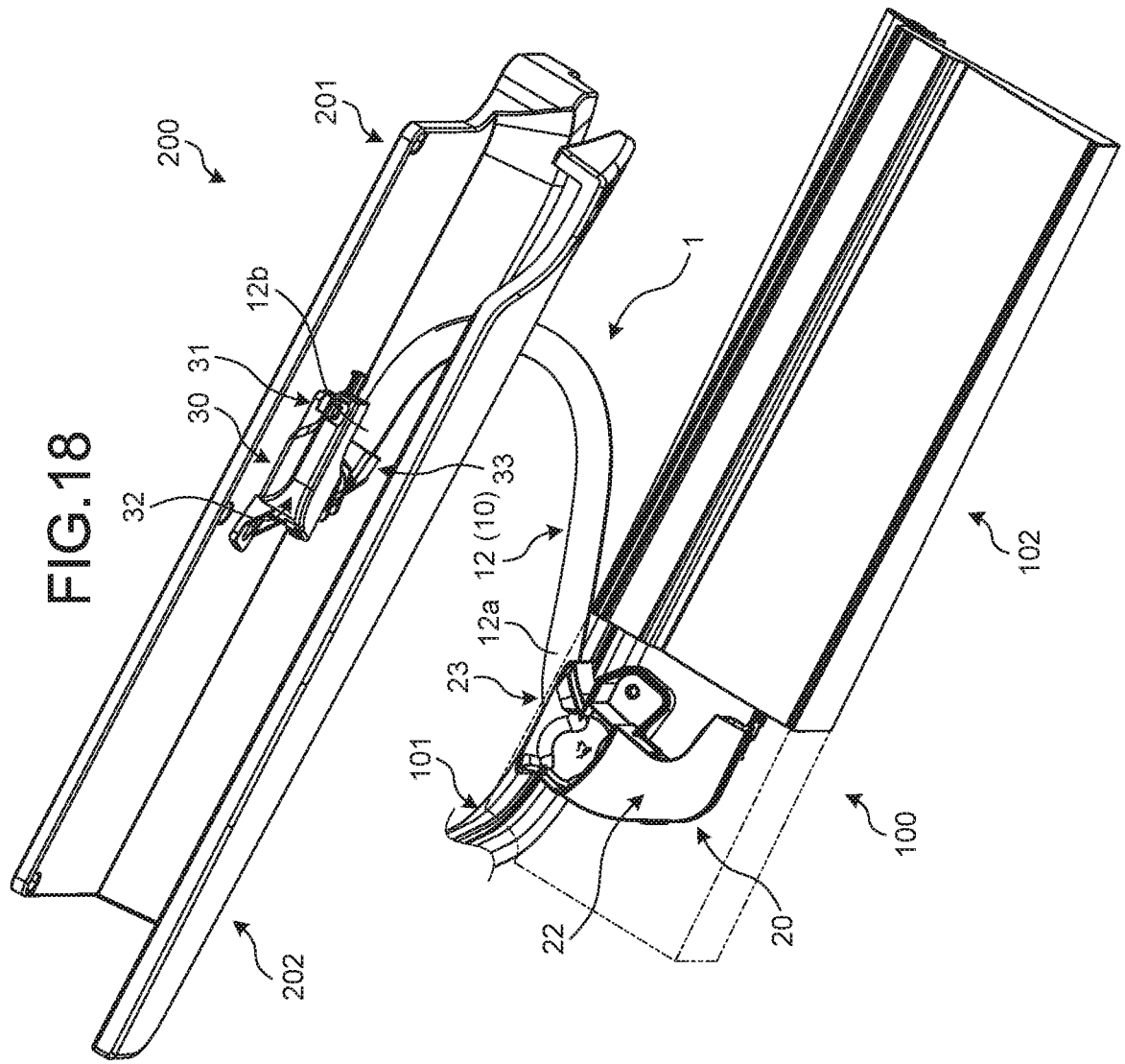
FIG. 18 is a perspective view illustrating a state of the slide door harness according to the embodiment at a third intermediate position.
Figure 19:
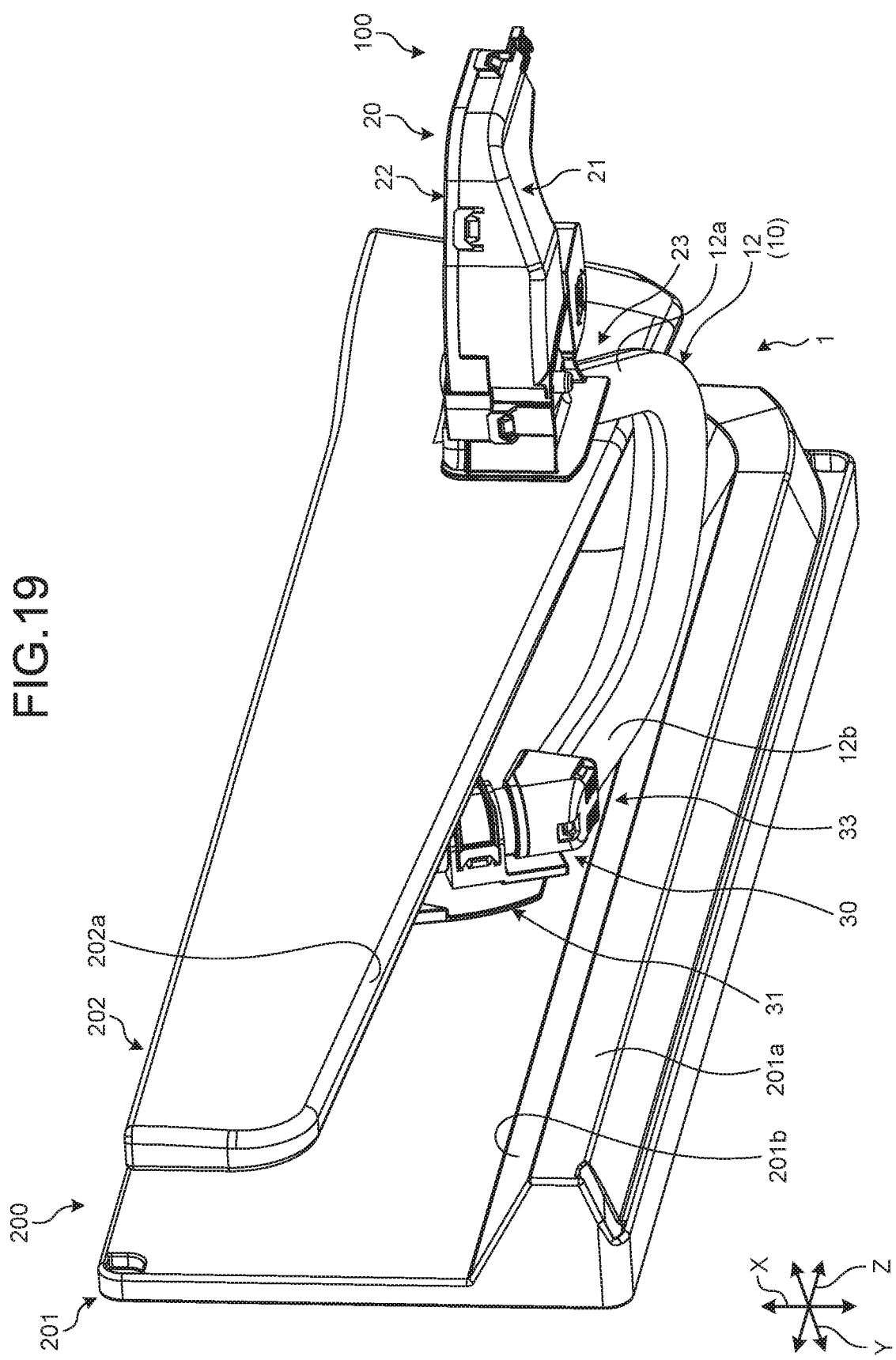
FIG. 19 is a schematic perspective view illustrating a state of the slide door harness according to the embodiment at the third intermediate position.
Figure 20:
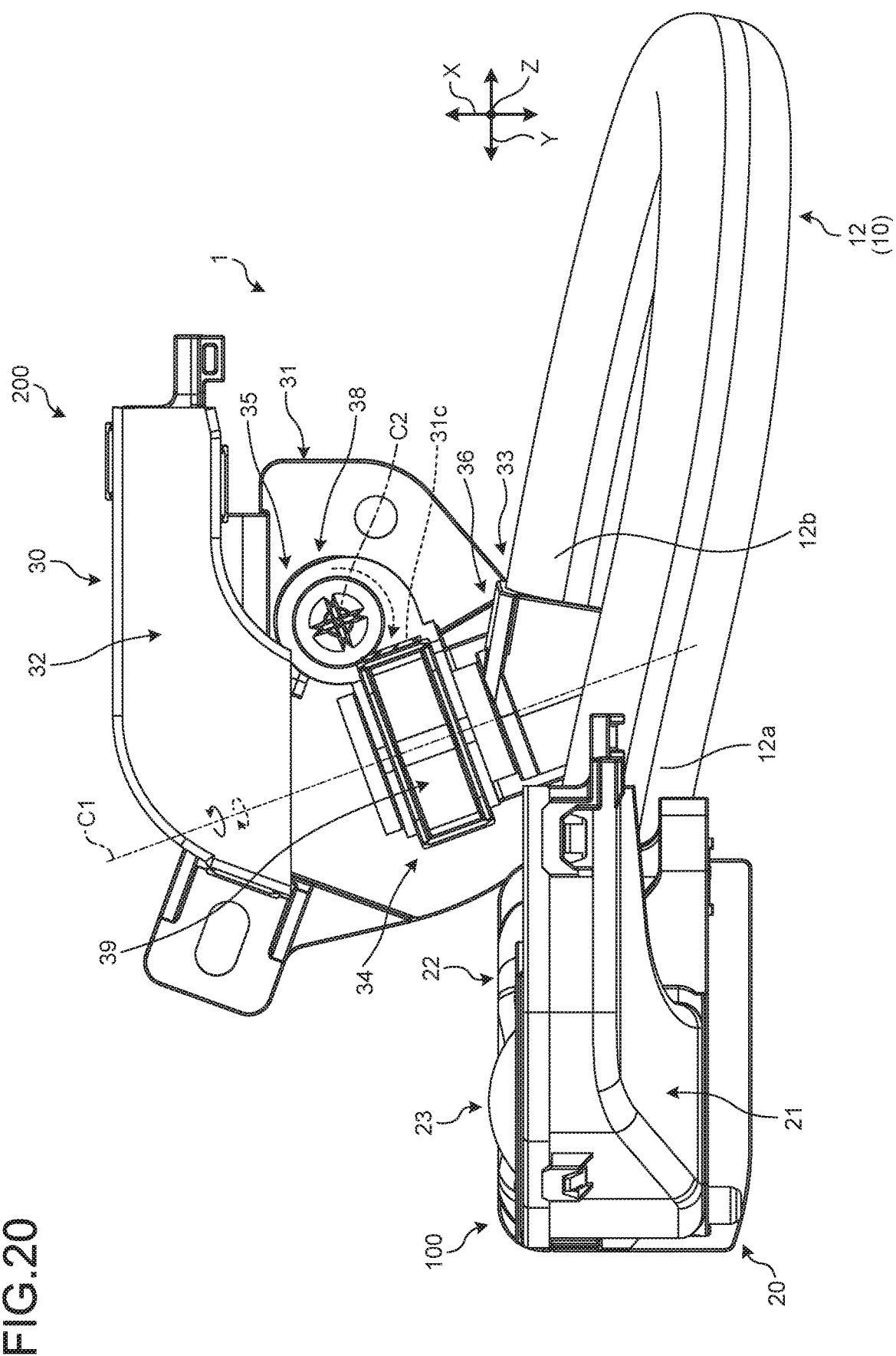
FIG. 20 is a schematic front view illustrating a state of the slide door harness according to the embodiment at the third intermediate position.
Figure 21:
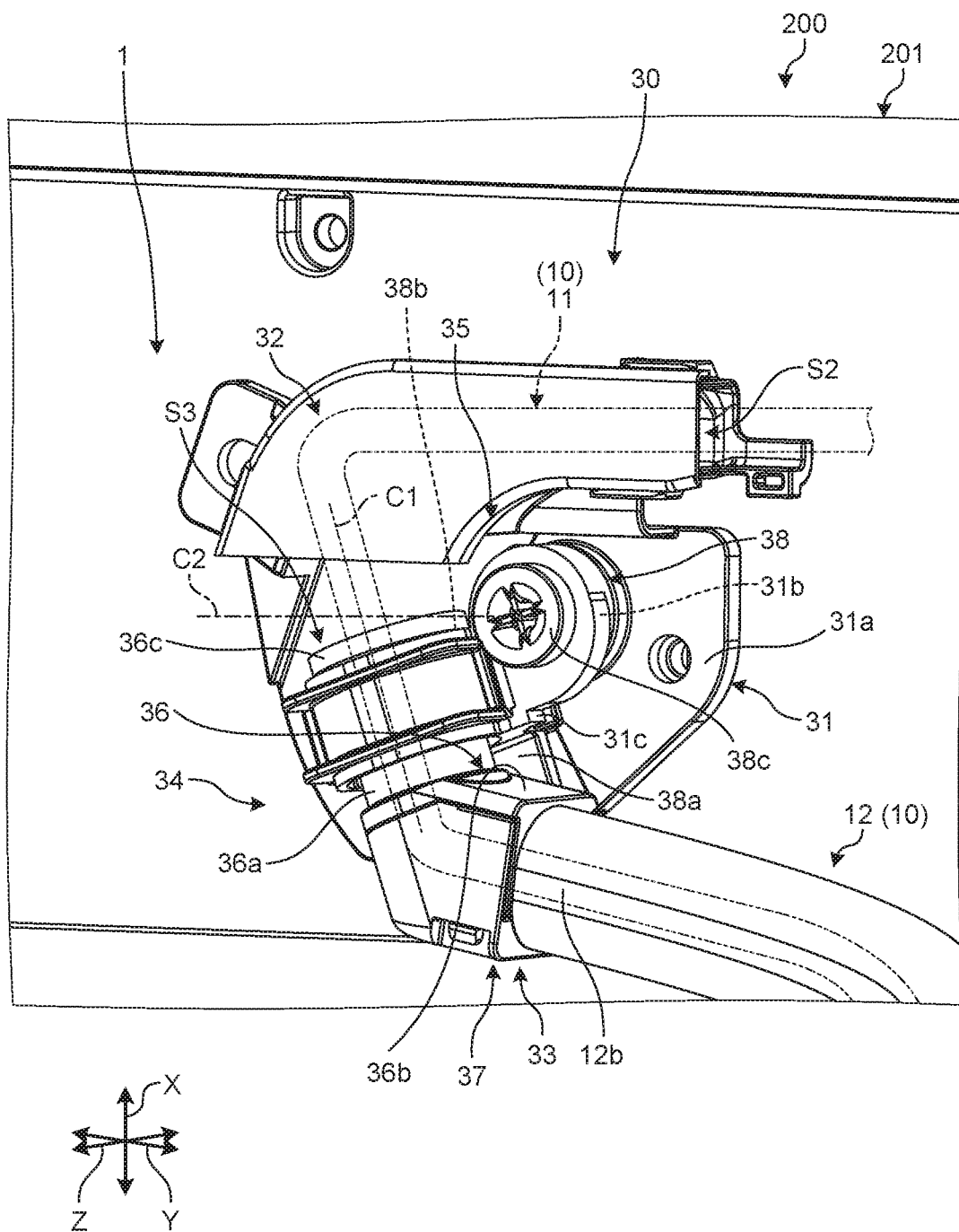
FIG. 21 is a perspective view illustrating the door-side fixing portion at the third intermediate position of the slide door harness according to the embodiment.

In the door-side fixing portion 30, when the slide door 200 continues to slide further and slides to the second intermediate position illustrated in FIGS. 15, 16 and 17, rotation by the first rotating shaft 34 and rotation by the second rotating shaft 35 are continued. As a result, in the door-side fixing portion 30, the holding position of the end 12b of the exterior material 12 by the holding portion 33 further changes. In this case, the second rotating shaft 35 continues an operation of rotating the second rotating member 38 together with the holding portion 33 to the fully closed position side in the first cross direction Y around the second rotation axis C2 (counterclockwise side around the second rotation axis C2 as indicated by a solid arrow in FIG. 17). Similarly, the first rotating shaft 34 continues an operation of rotating the first rotating member 36 and the first pressing member 37 included in the holding portion 33 to the fully closed position side in the first cross direction Y around the first rotation axis C1 (counterclockwise side around the first rotation axis C1 as indicated by a solid arrow in FIG. 17). In this way, when compared to a state in which the slide door 200 is at the first intermediate position, the door-side fixing portion 30 further rotates the lower end of the holding portion 33 and the end 12b of the exterior material 12 downward in the vertical direction X. As a result, when compared to the state in which the slide door 200 is at the first intermediate position, the door-side fixing portion 30 further moves the holding position of the end 12b of the exterior material 12 by the holding portion 33 downward in the vertical direction X. In this state, from a state in which the exterior material 12 is housed between the trim 202 and the inner panel 201, the end 12a side is in a state of being further pulled out to the vehicle body-side fixing portion 20 side via the lower side of the lower end 202a of the trim 202.

In addition, in this state, the first rotation axis C1 of the first rotating shaft 34 is in a state of extending substantially along the vertical direction X. In this state, in the door-side fixing portion 30, the lower end of the holding portion 33 and the end 12b of the exterior material 12 face the trim 202 side in the second cross direction Z.

In the door-side fixing portion 30, when the slide door 200 continues to slide further and slides to the third intermediate position illustrated in FIGS. 18, 19, 20, and 21, while rotation by the first rotating shaft 34 is continued, rotation by the second rotating shaft 35 is restricted by the rotation restricting portion 31c. The rotation restricting portion 31c comes into contact with the end surface of the plate-shaped portion 38a of the second rotating member 38 at the third intermediate position at which the exterior material 12 and the lower end 202a of the trim 202 do not interfere with each other with slide movement from the fully closed position side to the fully open position side of the slide door 200 (see FIG. 21). In this way, the rotation restricting portion 31c can restrict rotation around the second rotation axis C2 by the second rotating shaft 35 at the third intermediate position. As a result, the door-side fixing portion 30 can restrict further lifting of the holding portion 33 and the end 12b of the exterior material 12 held by the holding portion 33 to an upper side thereof in the vertical direction X, and suppress interference between the exterior material 12 and the lower end 202a of the trim 202. Meanwhile, the first rotating shaft 34 continues an operation of rotating the first rotating member 36 and the first pressing member 37 included in the holding portion 33 to the fully closed position side in the first cross direction Y around the first rotation axis C1 (counterclockwise side around the first rotation axis C1 as indicated by a solid arrow in FIG. 20). In this way, in the door-side fixing portion 30, the lower end of the holding portion 33 and the end 12b side of the exterior material 12 are inverted along the first cross direction Y by following the door-side fixing portion 30 to face the fully closed position side in the first cross direction Y. In this state, the door-side fixing portion 30 is in a state of being closest to the vehicle body-side fixing portion 20 in the first cross direction Y. Then, in the exterior material 12, the end 12a side is in a state of being pulled out to the vehicle body-side fixing portion 20 side via the lower side of the lower end 202a of the trim 202, and the end 12b side is inverted along the first cross direction Y, so that the exterior material 12 is substantially U-shaped as a whole. In addition, in this state, the first rotation axis C1 of the first rotating shaft 34 is inclined with respect to the vertical direction X and the first cross direction Y. More specifically, in this state, when viewed along the second cross direction Z (see viewing in the second cross direction of FIG. 20), the first rotation axis C1 of the first rotating shaft 34 is inclined with respect to the vertical direction X such that an upper side is shifted to the fully open position side in the first cross direction Y and a lower side is shifted to the fully closed position side in the first cross direction Y.

Figure 22:
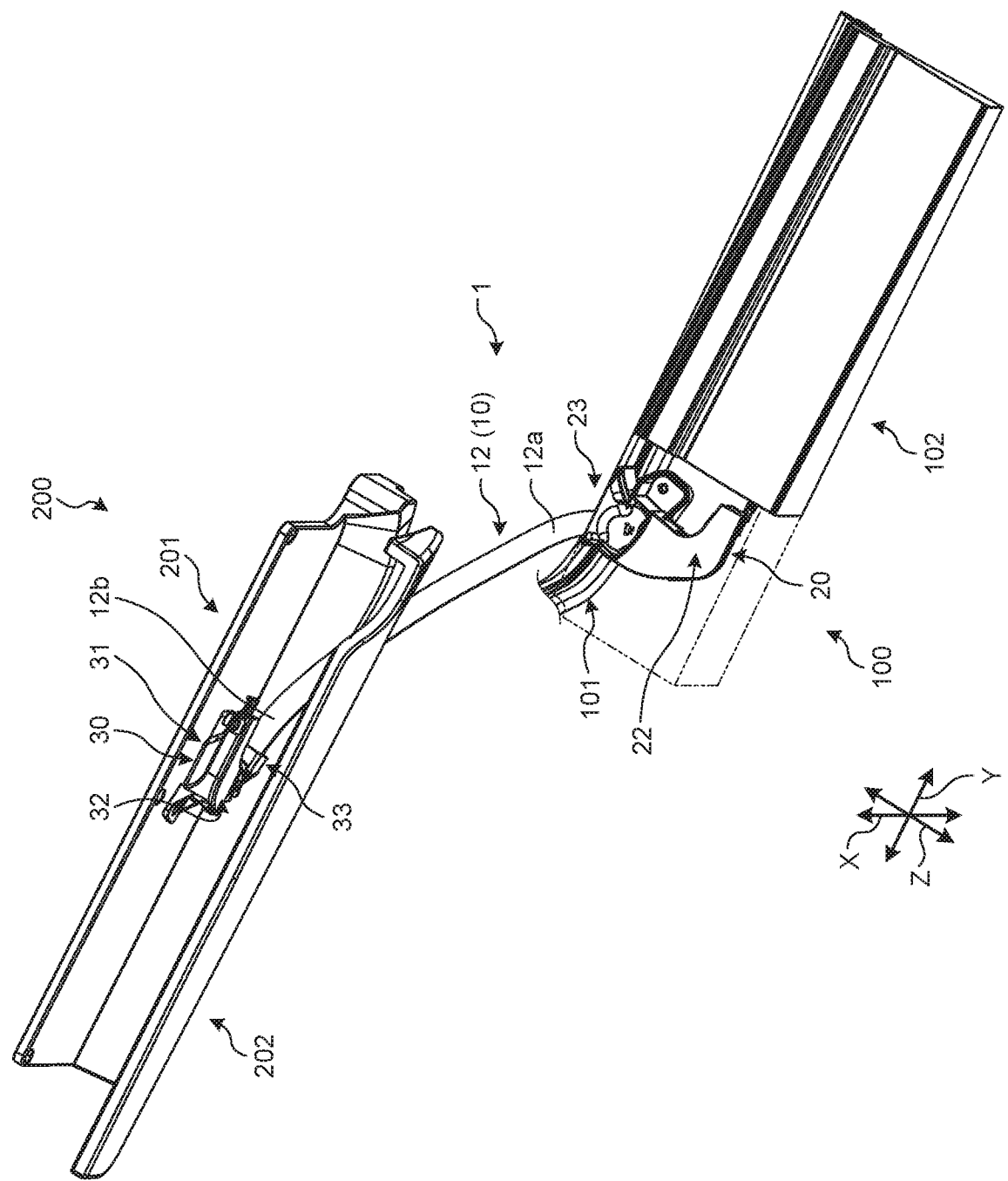
FIG. 22 is a perspective view illustrating a state of the slide door harness according to the embodiment at a fully open position.
Figure 23:
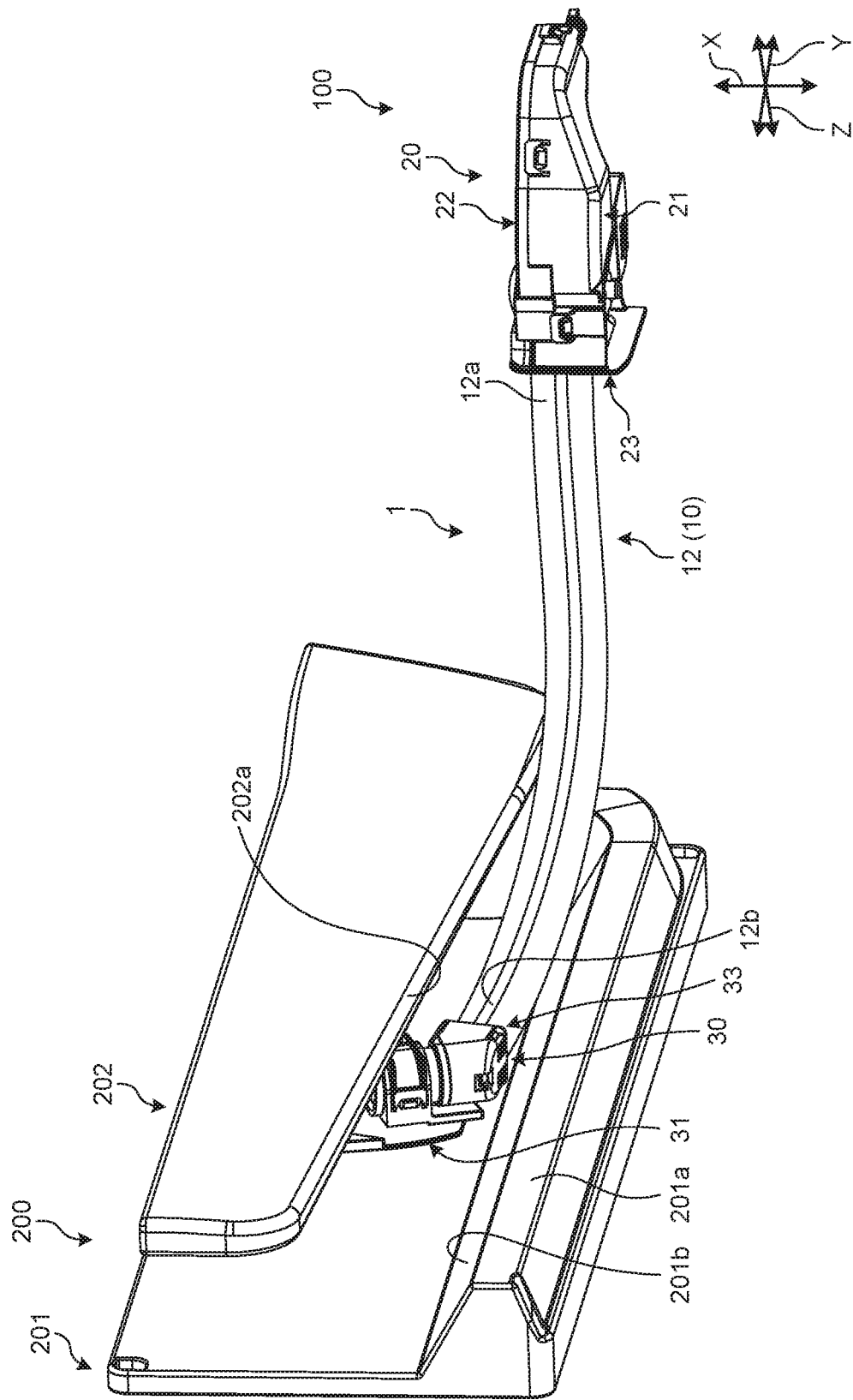
FIG. 23 is a schematic perspective view illustrating a state of the slide door harness according to the embodiment at the fully open position.
Figure 24:
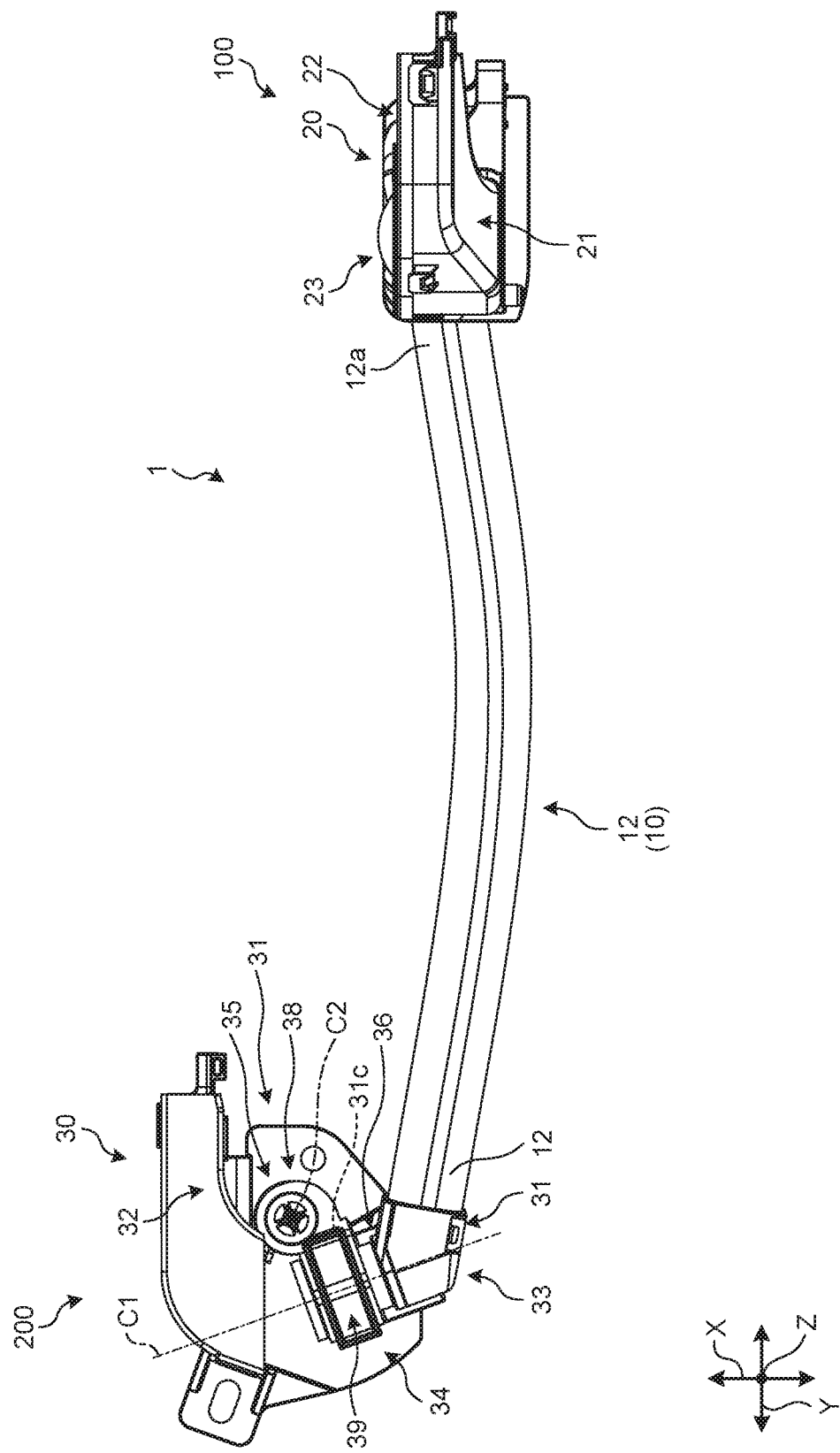
FIG. 24 is a schematic front view illustrating a state of the slide door harness according to the embodiment at the fully open position.

Further, in the door-side fixing portion 30, when the slide door 200 continues to slide further and slides to the fully open position illustrated in FIGS. 22, 23, and 24, rotation by the second rotating shaft 35 is restricted by the rotation restricting portion 31c, and rotation by the first rotating shaft 34 is in a stopped state. In this state, the door-side fixing portion 30 moves away from the vehicle body-side fixing portion 20 along the first cross direction Y and moves to the fully open position with slide movement of the slide door 200. In this case, the second rotating shaft 35 is continued in a state in which rotation around the second rotation axis C2 is restricted by the rotation restricting portion 31c. In addition, the first rotating shaft 34 is maintained in a state in which rotation of the first rotating member 36 and the first pressing member 37 around the first rotation axis C1 is stopped. In this state, similarly to the state at the third intermediate position, the first rotation axis C1 of the first rotating shaft 34 is in a state of being inclined with respect to the vertical direction and the first cross direction Y. Further, in this state, in the door-side fixing portion 30, the lower end of the holding portion 33 and the end 12b of the exterior material 12 face the fully closed position side in the first cross direction Y, that is, the vehicle body-side fixing portion 20 side. In addition, the rotation holding portion 23 of the vehicle body-side fixing portion 20 follows slide movement of the slide door 200 to rotate and hold the end 12a of the exterior material 12 and faces the door-side fixing portion 30 side. In this state, the door-side fixing portion 30 positions the exterior material 12 straddling the lower end 202a of the trim 202 across the vehicle body-side fixing portion 20 side and the door-side fixing portion 30 side.

Operation When Slide Door 200 Slides From Fully Open Position to Fully Closed Position Next, a description will be given of a case where the slide door 200 slides from a fully open position state illustrated in FIGS. 22, 23, and 24 to the fully closed position side. When the slide door 200 slides from the fully open position state to the third intermediate position illustrated in FIGS. 18, 19, 20, and 21, the door-side fixing portion 30 approaches the vehicle body-side fixing portion 20 side with this slide movement. In this state, in the door-side fixing portion 30, rotation arounds the first rotation axis C1 by the first rotating shaft 34 and rotation around the second rotation axis C2 by the second rotating shaft 35 are not started yet.

In the door-side fixing portion 30, when the slide door 200 continues to slide further and slides to the second intermediate position illustrated in FIGS. 15, 16, and 17, the holding portion 33 is pulled by the exterior material 12 with this slide movement. As a result, in the door-side fixing portion 30, rotation arounds the first rotation axis C1 by the first rotating shaft 34 and rotation around the second rotation axis C2 by the second rotating shaft 35 are started, and the holding position of the end 12b of the exterior material 12 by the holding portion 33 changes. In this case, the second rotating shaft 35 rotates the second rotating member 38 together with the holding portion 33 to the fully open position side in the first cross direction Y around the second rotation axis C2 (clockwise side around the second rotation axis C2 as indicated by a dotted arrow in FIGS. 17 and 20). Then, the first rotating shaft 34 rotates the first rotating member 36 and the first pressing member 37 included in the holding portion 33 to the fully open position side in the first cross direction Y around the first rotation axis C1 (clockwise side around the first rotation axis C1 as indicated by a dotted arrow in FIGS. 17 and 20). In this way, in the door-side fixing portion 30, the lower end of the holding portion 33 and the end 12b of the exterior material 12 face the trim 202 side in the second cross direction Z. In this state, the door-side fixing portion 30 moves away from the vehicle body-side fixing portion 20 along the first cross direction Y and moves to the fully closed position side with slide movement of the slide door 200.

In the door-side fixing portion 30, when the slide door 200 continues to slide further and slides to the first intermediate position illustrated in FIGS. 12, 13 and 14, rotation by the first rotating shaft 34 and rotation by the second rotating shaft 35 are continued. As a result, in the door-side fixing portion 30, the holding position of the end 12b of the exterior material 12 by the holding portion 33 further changes. In this case, the second rotating shaft 35 continues an operation of rotating the second rotating member 38 together with the holding portion 33 to the fully open position side in the first cross direction Y around the second rotation axis C2 (clockwise side around the second rotation axis C2 as indicated by a dotted arrow in FIG. 14). Similarly, the first rotating shaft 34 continues an operation of rotating the first rotating member 36 and the first pressing member 37 included in the holding portion 33 to the fully open position side in the first cross direction Y around the first rotation axis C1 (clockwise side around the first rotation axis C1 as indicated by a dotted arrow in FIG. 14). In this way, when compared to a state in which the slide door 200 is at the second intermediate position, the door-side fixing portion 30 rotates the lower end of the holding portion 33 and the end 12b of the exterior material 12 upward in the vertical direction X. In addition, in this instance, in the door-side fixing portion 30, the lower end of the holding portion 33 and the end 12b side of the exterior material 12 are inverted along the first cross direction Y by following the vehicle body-side fixing portion 20 to face the fully open position side (vehicle body-side fixing portion 20 side) in the first cross direction Y. As a result, when compared to the state in which the slide door 200 is at the second intermediate position, the door-side fixing portion 30 lifts and moves the holding position of the end 12b of the exterior material 12 by the holding portion 33 upward in the vertical direction X.

Further, in the door-side fixing portion 30, when the slide door 200 continues to slide further and slides to the fully closed position illustrated in FIGS. 9, 10 and 11, rotation by the first rotating shaft 34 and rotation by the second rotating shaft 35 are continued. As a result, in the door-side fixing portion 30, the holding position of the end 12b of the exterior material 12 by the holding portion 33 further changes. In this case, the second rotating shaft 35 continues an operation of rotating the second rotating member 38 together with the holding portion 33 to the fully open position side in the first cross direction Y around the second rotation axis C2 (clockwise side around the second rotation axis C2 as indicated by a dotted arrow in FIG. 14). Similarly, the first rotating shaft 34 continues an operation of rotating the first rotating member 36 and the first pressing member 37 included in the holding portion 33 to the fully open position side in the first cross direction Y around the first rotation axis C1 (clockwise side around the first rotation axis C1 as indicated by a dotted arrow in FIG. 14). In this way, when compared to a state in which the slide door 200 is at the first intermediate position, the door-side fixing portion 30 further rotates the lower end of the holding portion 33 and the end 12b of the exterior material 12 upward in the vertical direction X. Further, in this instance, in the door-side fixing portion 30, the lower end of the holding portion 33 and the end 12b side of the exterior material 12 further face the fully open position side (vehicle body-side fixing portion 20 side) in the first cross direction Y. As a result, when compared to the state in which the slide door 200 is at the first intermediate position, the door-side fixing portion 30 further lifts and moves the holding position of the end 12b of the exterior material 12 by the holding portion 33 upward in the vertical direction X. Then, at the fully closed position, the door-side fixing portion 30 holds the end 12b of the exterior material 12 above the lower end 202a of the trim 202 in the vertical direction X (see the door-side fixing portion 30A and the exterior material 12A of FIG. 8), and positions substantially the entire exterior material 12 on the door-side fixing portion 30 side of the trim 202. As a result, the door-side fixing portion 30 is in a state of housing substantially the entire exterior material 12 on the inner panel 201 side of the trim 202. In addition, by holding the end 12b of the exterior material 12 on the upper side in the vertical direction X at the fully closed position, the door-side fixing portion 30 can prevent the bracket portion 36b and the first pressing member 37 included in the holding portion 33 from interfering with the inclined surface 201b of the inner panel 201. In this state, as described above, the slide door 200 is close to the vehicle body 100 and closes the opening, and the protrusion 201a of the inner panel 201 is brought into close contact with and pressed against the weather strip 101.

In the slide door harness 1 described above, the exterior material 12 included in the wiring material 10 is wired across the slide door 200 and the vehicle body 100. Further, the slide door harness 1 rotatably holds both ends of the exterior material 12 by the vehicle body-side fixing portion 20 and the door-side fixing portion 30, respectively, with slide movement of the slide door 200. In such a configuration, the slide door harness 1 holds the end 12a of the exterior material 12 on the vehicle body-side fixing portion 20 side below the lower end 202a of the trim 202 in the vertical direction X. On the other hand, the slide door harness 1 holds the end 12b of the exterior material 12 on the door-side fixing portion 30 side toward the lower end 202a side of the trim 202 by the holding portion 33. According to this configuration, the slide door harness 1 can hide the door-side fixing portion 30 behind the trim 202, and then wire the exterior material 12 across the vehicle body-side fixing portion 20 side and the door-side fixing portion 30 side via the lower end 202a side of the trim 202.

Then, the slide door harness 1 can combine rotation by the first rotating shaft 34 and rotation by the second rotating shaft 35 in the door-side fixing portion 30 to rotate the end of the exterior material 12 by two axes with slide movement of the slide door 200. According to this configuration, the slide door harness 1 rotates the end 12b of the exterior material 12 downward in the vertical direction X with slide movement of the slide door 200 from the fully closed position side to the fully open position side. In this way, the slide door harness 1 can position the exterior material 12 straddling the lower end 202a across the vehicle body-side fixing portion 20 side and the door-side fixing portion 30 side without causing the exterior material 12 to interfere with a surrounding object such as the lower end 202a of the trim 202. Meanwhile, the slide door harness 1 rotates the end 12b of the exterior material 12 upward in the vertical direction X with slide movement of the slide door 200 from the fully open position side to the fully closed position side. In this way, the slide door harness 1 can suppress the exterior material 12 from being interposed between the vehicle body 100 and the slide door 200 without causing the exterior material 12 to interfere with a surrounding object such as the lower end 202a of the trim 202. Then, at the fully closed position, the slide door harness 1 can house substantially the entire exterior material 12 on the door-side fixing portion 30 side of the trim 202, which cannot be seen from the vehicle interior, by holding the end 12b of the exterior material 12 above the lower end 202a of the trim 202 in the vertical direction X. According to this configuration, the slide door harness 1 can narrow a gap between the scuff 102 and the lower end 202a of the trim 202 when the slide door 200 is fully closed, and then obtain a configuration having an excellent appearance by the exterior material 12 hidden behind the trim 202. Further, as a result, the slide door harness 1 can prevent the exterior material 12 from being unintentionally kicked, so that damage, etc. can be suppressed.

In addition, as described above, by rotating the end 12b of the exterior material 12 by two axes with slide movement of the slide door 200 in the door-side fixing portion 30, the slide door harness 1 can suppress the exterior material 12 from being excessively twisted and reduce stress generated in the exterior material 12. As a result, the slide door harness 1 can improve the durability of the exterior material 12.

In addition, the slide door harness 1 is configured to rotate the end 12b of the exterior material 12 by two axes with slide movement of the slide door 200, so that it is possible to reduce an occupancy rate of the door-side fixing portion 30 in the slide door 200 when compared to a so-called arm-type holding mechanism, etc. As a result, the slide door harness 1 can realize the above-described interference suppression, appearance improvement, stress relaxation, etc. while suppressing deterioration of mountability.

As described above, the slide door harness 1 of the present embodiment can properly wire the wiring material 10 including the exterior material 12 with respect to the slide door 200.

Here, in the slide door harness 1 described above, in the door-side fixing portion 30, rotation by the second rotating shaft 35 is restricted by the rotation restricting portion 31c at the intermediate position with slide movement of the slide door 200 from the fully closed position side to the fully open position side. According to this configuration, the slide door harness 1 can reliably suppress the holding portion 33 and the end 12b of the exterior material 12 held by the holding portion 33 from being lifted up in the vertical direction X beyond a bottom dead point to cause interference between the exterior material 12 and the lower end 202a of the trim 202. That is, the slide door harness 1 can prevent the slide door 200 from excessively rotating on the second rotating shaft 35 during slide movement from the fully closed position side to the fully open position side. In this way, it is possible to reliably prevent the exterior material 12 from interfering with the lower end 202a of the trim 202.

Note that the slide door harness according to the above-described embodiment of the invention is not limited to the above-described embodiment, and various modifications can be made within the scope of the claims.

In the above description, it is presumed that the wiring material 10 includes the electric wire 11 and the exterior material 12, and the wiring material 10 whose both ends are held by the vehicle body-side fixing portion 20 and the door-side fixing portion 30 is the exterior material 12. However, the invention is not limited thereto. The wiring material may include an electric wire, and the vehicle body-side fixing portion 20 and the door-side fixing portion 30 may be configured to hold both ends of the electric wire included in the wiring material.

In the above description, it is presumed that the holding portion 33, the first rotating shaft 34, and the second rotating shaft 35 are configured by combining the base member 31, the first rotating member 36, the first pressing member 37, the second rotating member 38, and the second pressing member 39. However, the invention is not limited thereto. For example, the holding portion 33 may include one member. In addition, a description has been on the assumption that the rotation restricting portion 31c is provided on the base member 31. However, the invention is not limited thereto, and the rotation restricting portion 31c may be provided on any member as long as rotation by the second rotating shaft 35 can be restricted at a predetermined position.

The slide door harness according to the present embodiment may be configured by appropriately combining the components of the above-described embodiment and modification.

In a slide door harness according to the embodiment, a wiring material is wired across a slide door and a vehicle body. Further, the side door harness rotatably holds both ends of the wiring material by a vehicle body-side fixing portion and a door-side fixing portion, respectively, with slide movement of the slide door. In such a configuration, the slide door harness holds the end of the wiring material on the vehicle body-side fixing portion side below a lower end of an inner surface member of the slide door in a vertical direction, and holds the end of the wiring material on the door-side fixing portion side toward the lower end side of the inner surface member by a holding portion in the vertical direction. According to this configuration, the slide door harness can hide the door-side fixing portion behind the inner surface member, and then wire the wiring material across the vehicle body-side fixing portion side and the door-slide fixing portion side via the lower end side of the inner surface member in the vertical direction. Then, the slide door harness can combine rotation by the first rotating shaft and rotation by the second rotating shaft in the door-side fixing portion to rotate the end of the exterior material by two axes with slide movement of the slide door. As a result, the slide door harness has an effect that the wiring material can be properly wired with respect to the slide door.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A slide door harness comprising:
   a wiring material wired across a slide door slidably provided between a fully closed position and a fully open position with respect to a vehicle body;
   a vehicle body-side fixing portion provided in the vehicle body to hold one end of the wiring material below a lower end of an inner surface member of the slide door on a side of the vehicle body in a vertical direction such that the end of the wiring material is allowed to rotate with slide movement of the slide door; and
   a door-side fixing portion provided on the slide door by being positioned on an opposite side from a vehicle body-side fixing portion side of the inner surface member with the inner surface member interposed therebetween to hold another end of the wiring material such that the another end is allowed to rotate with slide movement of the slide door, wherein
   the door-side fixing portion includes
      a holding portion configured to hold the another end of the wiring material toward a side of the lower end of the inner surface member in the vertical direction,
      a first rotating shaft configured to allow the holding portion to rotate around a first rotation axis, and
      a second rotating shaft configured to allow the holding portion and the first rotating shaft to integrally rotate around a second rotation axis intersecting the first rotation axis, and
   rotation around the first rotation axis by the first rotating shaft and rotation around the second rotation axis by the second rotating shaft are combined so that the another end of the wiring material is rotated downward in the vertical direction with slide movement of the slide door from a side of the fully closed position to an intermediate position and from the intermediate position to a side of the fully open position, the wiring material is positioned across the vehicle body-side fixing portion side of the inner surface member and a door-side fixing portion side of the inner surface member by straddling the lower end of the inner surface member in the vertical direction, the another end of the wiring material is rotated upward in the vertical direction with slide movement of the slide door from the fully open position side to the fully closed position side, the another end of the wiring material is held above the lower end of the inner surface member in the vertical direction at the fully closed position, and the wiring material is positioned on the door-side fixing portion side of the inner surface member.

2. The slide door harness according to claim 1, wherein the door-side fixing portion includes a rotation restricting portion configured to restrict rotation around the second rotation axis by the second rotating shaft at an intermediate position where the wiring material and the lower end of the inner surface member in the vertical direction do not interfere with each other with slide movement of the slide door from the fully closed position side to the fully open position side.

* * * * *